(12) United States Patent
Garg et al.

(10) Patent No.: US 9,625,886 B1
(45) Date of Patent: Apr. 18, 2017

(54) CONDITIONALLY ACTIVE MIN-MAX LIMIT REGULATORS

(71) Applicant: The United States of America as represented by the Administrator of the National Aeronautics and Space Administration, Washington, DC (US)

(72) Inventors: Sanjay Garg, Westlake, OH (US); Ryan D. May, Cleveland, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 1001 days.

(21) Appl. No.: 13/900,642

(22) Filed: May 23, 2013

Related U.S. Application Data

(60) Provisional application No. 61/663,184, filed on Jun. 22, 2012.

(51) Int. Cl.
| | |
|---|---|
| B64C 27/00 | (2006.01) |
| B64C 39/00 | (2006.01) |
| G05D 1/00 | (2006.01) |
| G05D 1/06 | (2006.01) |
| G05D 3/00 | (2006.01) |
| G06F 7/00 | (2006.01) |
| G06F 17/00 | (2006.01) |
| G05B 15/02 | (2006.01) |

(52) U.S. Cl.
CPC .................................. *G05B 15/02* (2013.01)

(58) Field of Classification Search
USPC ....................... 244/62, 75.1; 701/8, 103–104
See application file for complete search history.

(56) References Cited

U.S. PATENT DOCUMENTS

| | | | | |
|---|---|---|---|---|
| 4,171,613 | A | * | 10/1979 | Schmidt-Roedenbeck F02C 9/28 60/39.281 |
| 4,437,303 | A | * | 3/1984 | Cantwell .................... F02C 9/28 60/243 |
| 4,453,378 | A | * | 6/1984 | Zagranski ............ G05D 1/0858 60/39.281 |
| 9,206,746 | B2 | * | 12/2015 | Djelassi .................... F02C 9/28 |

(Continued)

OTHER PUBLICATIONS

Reducing Conservatism in Aircraft Engine Response Using Conditionally Active Min-Max Limit Regulators; NASA Technical Memorandum # 2012-217814; by May et al., Published on Dec. 2012; 18 pages.*

(Continued)

*Primary Examiner* — Ronald Hartman, Jr.
(74) *Attorney, Agent, or Firm* — Robert H. Earp, III

(57) ABSTRACT

A conditionally active limit regulator may be used to regulate the performance of engines or other limit regulated systems. A computing system may determine whether a variable to be limited is within a predetermined range of a limit value as a first condition. The computing system may also determine whether a current rate of increase or decrease of the variable to be limited is great enough that the variable will reach the limit within a predetermined period of time with no other changes as a second condition. When both conditions are true, the computing system may activate a simulated or physical limit regulator.

20 Claims, 20 Drawing Sheets

(56) References Cited

U.S. PATENT DOCUMENTS

| | | | |
|---|---|---|---|
| 2004/0002806 A1* | 1/2004 | Bellinger | B60W 30/1819 701/104 |
| 2004/0031267 A1* | 2/2004 | Otake | B64C 11/303 60/601 |
| 2011/0197593 A1* | 8/2011 | Fuchs | F01D 15/10 60/773 |
| 2013/0008171 A1* | 1/2013 | Djelassi | F02C 9/28 60/772 |
| 2015/0219528 A1* | 8/2015 | Djelassi | F02C 9/28 702/44 |
| 2016/0146116 A1* | 5/2016 | Haillot | F02C 9/28 701/100 |

OTHER PUBLICATIONS

ASME Turbo Expo 2012, vol. 1, printed from Internet on May 31, 2016; shows the papers presented at the EXPO; 11 pages.*

* cited by examiner

CONDITIONALLY ACTIVE MIN-MAX LIMIT REGULATORS

CROSS REFERENCE TO RELATED APPLICATION

This application is a non-provisional of, and claims priority to, U.S. Provisional Patent Application Ser. No. 61/663,184 filed Jun. 22, 2012. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

The invention described herein was also made in the performance of work under a NASA contract and is subject to the provisions of Section 305 of the National Aeronautics and Space Action of 1958, Public Law 85-568 (72 Stat. 435; 42 U.S.C. 2457).

FIELD

The present invention generally pertains to limit regulation, and more specifically, to conditionally active limit regulators.

BACKGROUND

The control systems in modern commercial aircraft engines are designed to operate the engine in a safe manner throughout its operating envelope during its on-wing life. Conventional systems in which performance is regulated, such as these aircraft engines, typically achieve this objective using Min-Max control selection to prevent the system from exceeding safety or operational limits. In the case of aircraft engines, this is performed during transients due to throttle commands, for example. A transient is a commanded change in a system setpoint. The architecture of a conventional engine control system 100 is illustrated in FIG. 1.

Each of the physical and operational engine limits of concern has an associated unique regulator. Each of these regulators generates a desired fuel flow rate (Wf) that maintains the limit. The throttle is used as input to either an engine pressure ratio (EPR) setpoint regulator or a fan speed (Nf) setpoint regulator. The desired fuel flow from the setpoint regulator and each of the maximum limit regulators is input to a minimum (Min) selector. The output of this Min selector and each of the minimum limit regulator outputs are input to a maximum (Max) selector. Thus, the output from the Min-Max selector is the fuel flow rate command that ensures that none of the operational and safety limits will be violated. Definitions for the various acronyms are provided in Table 1 below.

The architecture of system 100, which is typical for today's commercial aircraft engine controllers, is inherently conservative. The engine limit regulators are typically designed as simple regulators (e.g., proportional-integral controllers) and they are each independently designed. The Min-Max architecture then ensures that the most conservative control input is chosen. While typically sufficient, in emergencies such as the Sioux City crash of United® flight 232 in 1989, this conservative design may prevent the engine from achieving faster response times that may be needed to provide adequate flight control.

A limit regulator can become active even when there is no immediate danger of reaching the limit. This results in a slower engine response than is actually necessary to maintain safe operation. The conservative limit protection approach of FIG. 1 prevents the engine from delivering the dynamic response that is actually achievable. Accordingly, improved limit regulation that yields faster transient responses may be beneficial.

SUMMARY

Certain embodiments of the present invention may be implemented and provide solutions to the problems and needs in the art that have not yet been fully solved by conventional limit regulation systems. For example, in some embodiments, the limit regulators may become active only when the variable to be limited is within a specified close bound of the actual limit value (i.e., the limit regulators are conditionally active (CA) limit regulators).

In one embodiment of the present invention, a computer-implemented method includes determining, by a computing system, whether a variable to be limited is within a predetermined range of a limit value as a first condition. The computer-implemented method also includes determining, by the computing system, whether a current rate of increase or decrease of the variable to be limited is great enough that the variable will reach the limit within a predetermined period of time with no other changes as a second condition. The computer-implemented method further includes activating, by the computing system, a simulated or physical limit regulator when the first condition and the second condition are true.

In another embodiment of the present invention, a computer-implemented method includes determining, by a computing system, whether a variable to be limited is within a predetermined range of a limit value as a first condition using at least one discrete equation. The computer-implemented method also includes determining, by the computing system, whether a current rate of increase or decrease of the variable to be limited is great enough that the variable will reach the limit within a predetermined period of time with no other changes as a second condition using at least one discrete equation. The computer-implemented method further includes activating, by the computing system, a simulated or physical limit regulator when the first condition and the second condition are true.

In yet another embodiment of the present invention, an apparatus includes memory storing computer program instructions and at least one processor configured to execute the computer program instructions stored in the memory. The at least one processor is configured to determine whether a variable to be limited is within a predetermined range of a limit value as a first condition. The at least one processor is also configured to determine whether a current rate of increase or decrease of the variable to be limited is great enough that the variable will reach the limit within a predetermined period of time with no other changes as a second condition. The at least one processor is further configured to activate a limit regulator when the first condition and the second condition are true.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to CA limit regulators that modify the conventional Min-Max architecture such that limit regulators are active only when the operating point of the engine is close to a particular limit and likely to exceed the limit absent a change within a predetermined period of time. This may result in an improvement in thrust response while maintaining the necessary safety limits for safe operation. However, embodiments of the present invention are not limited to aircraft engines and may be used for any suitable terrestrial or aerospace application where limit regulation is employed, including power plants, spacecraft, automobiles, or any other desired system, including non-engine applications. Some definitions employed in this specification and the figures are presented in Table 1 below.

TABLE 1

DEFINITIONS

| Variable | Definition |
| --- | --- |
| α | Constant that defines the error bound for a conditionally active limiter |
| ALT | Altitude |
| β | Constant that defines the error derivative bound for a conditionally active limiter |
| CA | Conditionally Active |
| C-MAPSS40k | Commercial Modular Aero-Propulsion System Simulation 40,000 lbf (pounds force) |
| e | limit regulator error |
| EPR | Engine Pressure Ratio |
| $F_{net}$ | Net engine thrust (lbf) |
| γ | Constant that defines an override enable for a conditionally active limit regulator |
| ISA | International Standard Atmosphere |
| HPC | High Pressure Compressor |
| MN | Mach number |
| Nc | Core Shaft Speed (rpm) |
| Nf | Fan Shaft Speed (rpm) |

TABLE 1-continued

DEFINITIONS

| Variable | Definition |
| --- | --- |
| PLA | Power Level Angle (degrees) |
| Ps3 | Combustor Entrance Static Pressure (psi) |
| RU | Ratio Unit (Wf/Ps3) in lbm/s/psi |
| SLS | Sea-level static flight condition (0 ft altitude, Mach 0.0, ISA + 0 degrees) |
| SM | Surge Margin (%) |
| ΔT | Controller step size (s) |
| Wf | Fuel Flow Rate (lbm/s) |
| y | The measured value of a limited engine parameter |
| $y_{max}$ | The maximum limit of the engine parameter y |
| $y_{min}$ | The minimum limit of the engine parameter y |

Figure 2:
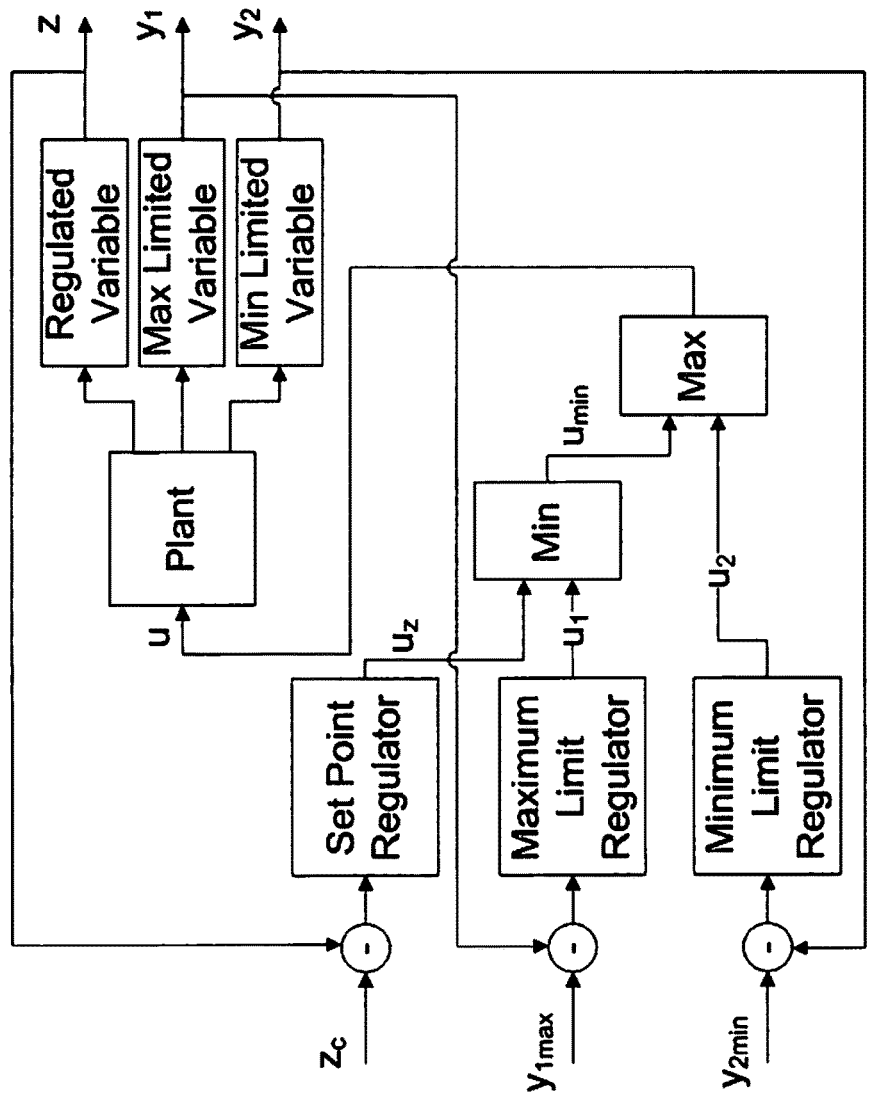
FIG. 2 illustrates a generic Min-Max scheme used to select the input to a plant such that the regulated variable, z, tracks $z_c$ with the constraints that $y_1$ does not exceed $y_{1max}$ and $y_2$ does not fall below $y_{2min}$.

In order to better understand Min-Max regulation, a Min-Max regulation scheme 200 is discussed with respect to FIG. 2. In Min-Max regulation scheme 200, the limit regulated outputs are constantly being used in the selection of the commanded input, u, to the plant. However, such an approach is inherently conservative in that the commanded input might be limited by one of the limit regulators even if the value of the output to be limited is far from its limit.

Conditionally Active (CA) Limit Regulation

Since the purpose of the limit regulator is to ensure that the specified limit is not violated, it does not need to be active if there is no chance of the limit being reached. The idea behind CA limit regulators in some embodiments is to make the limit regulator active in the Min-Max selection scheme only when there is a reasonable chance that the limit will be reached if the input command generated by the setpoint regulator or another limit regulator is not modified. The limit regulator can become active when the current control command is driving the system "towards" the limit. This control command is created by either the setpoint controller or another limit regulator.

An operational region for a CA limit regulator to be active in the Min-Max selection scheme can then be defined as: Condition 1—the variable to be limited is "close" to its limit value; and Condition 2—the variable's current rate is such that it will reach the limit within a certain period of time with no other changes. In order for the limit regulator to be active, both Conditions 1 and 2 should be true.

For the case of a maximum limit variable, $y_{1max}$, the objective will be to keep $y_1 \leq y_{1max}$. Condition 1 can then be stated as:

$$y_1 \geq (1-\alpha_1)*y_{1max} \quad (1)$$

where $\alpha_1$ is a design parameter that is non-negative.

For Condition 2, the controller update time may be considered to be ΔT with the objective of activating the limit regulator if the current rate of change of $y_1$ is such that it will reach $y_{1max}$ in $\beta_1$ time steps. Condition 2 can thus be stated as:

$$y_1 + \frac{d}{dt}y_1 * \beta_1 * \Delta T \geq y_{1max} \quad (2)$$

where $\beta_1$ is a design parameter that is non-negative.

Figure 3:
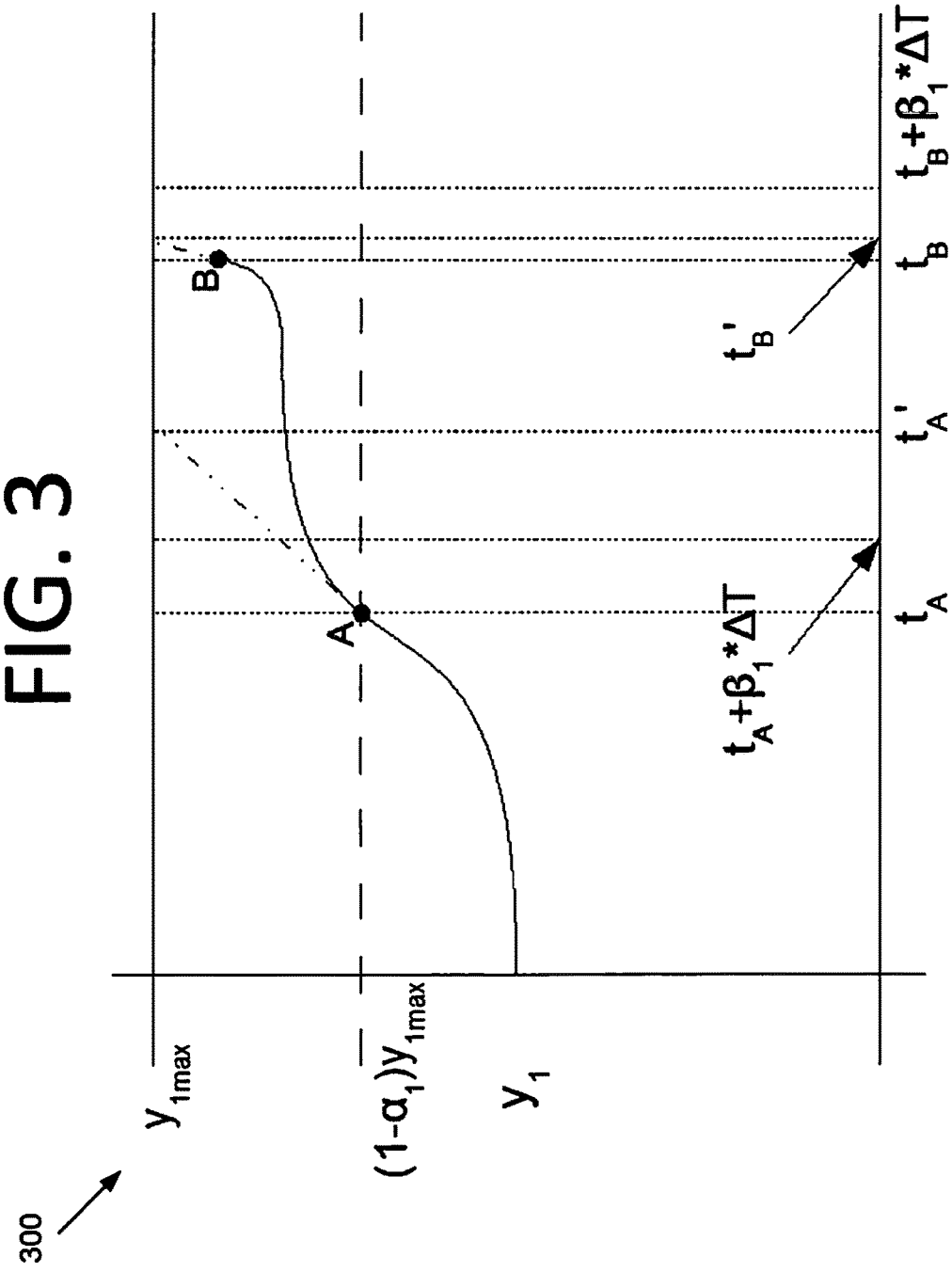
FIG. 3 is a graph 300 illustrating an example $y_1(t)$ for which Eq. (1) is satisfied starting at $t_A$, but Eq. (2) isn't satisfied until $t_B$, according to an embodiment of the present invention.

An example maximum limited output variable trajectory is shown in graph 300 of FIG. 3. The output, $y_1$, is initially below the limit and both Eq. (1) and Eq. (2) are false. At time $t_A$, $y_1$ crosses into the region for which Eq. (1) is true, i.e., $y_1$ is "close" to the limit. However, the slope at point A is too low to intersect $y_{1max}$ within $\beta_1$ time steps $(t_A'>t_A+\beta_1*\Delta T)$.

At all points between A and B, the slope still does not exceed the necessary threshold. Visually, it does not appear that the trajectory will violate the limit within the time specified by $\beta_1*\Delta T$. However, at point B, there is a sudden upswing and now Eq. (2) is validated $(t_B'<t_B+\beta_1*\Delta T)$. Thus, the CA limit regulator would become active and act to restrict the input to prevent $y_1$ from exceeding $y_{1max}$.

For the case of a minimum limit variable, $y_2$, the objective will be to keep $y_2 \geq y_{2min}$. Conditions 1 and 2 can be modified into equations analogous to Eq. (1) and Eq. (2) with non-negative design parameters $\alpha_2$ and $\beta_2$.

$$y_2 \leq (1+\alpha_2)*y_{2min} \quad (3)$$

$$y_2 + \frac{d}{dt}y_2 * \beta_2 * \Delta T \leq y_{2min} \quad (4)$$

It should be noted that when Condition 1 is met (i.e., the variable is "close" to the limit), the construction of Condition 2 can cause the limit regulator to switch between active and inactive. This behavior could result in chatter in the fuel flow command. If this chatter is found to occur and negatively impact performance, an additional condition (Condition 3), such as $y_1 \geq (1-\gamma_1)*y_{1max}$, could be imposed, where $\gamma_1$ is a non-negative number that is less than $\alpha_1$. Condition 3 may be included in the CA activation logic through the following Boolean expression: (Condition 1 AND Condition 2) OR Condition 3.

Defining the maximum limit regulator error as $e_1 = y_{1max} - y_1$, Eq. (1) and Eq. (2) can be rewritten as:

$$e_1 \leq \alpha_1 * y_{1max} \quad (5)$$

$$\frac{d}{dt}e_1 \leq \frac{-e_1}{\beta_1 * \Delta T} \quad (6)$$

With the minimum limit regulator error defined as $e_2 = y_{2min} - y_2$, Eq. (3) and Eq. (4) can be stated as:

$$e_2 \geq -\alpha_2 * y_{2min} \quad (7)$$

$$\frac{d}{dt}e_2 \geq \frac{-e_2}{\beta_2 * \Delta T} \quad (8)$$

Figure 4:
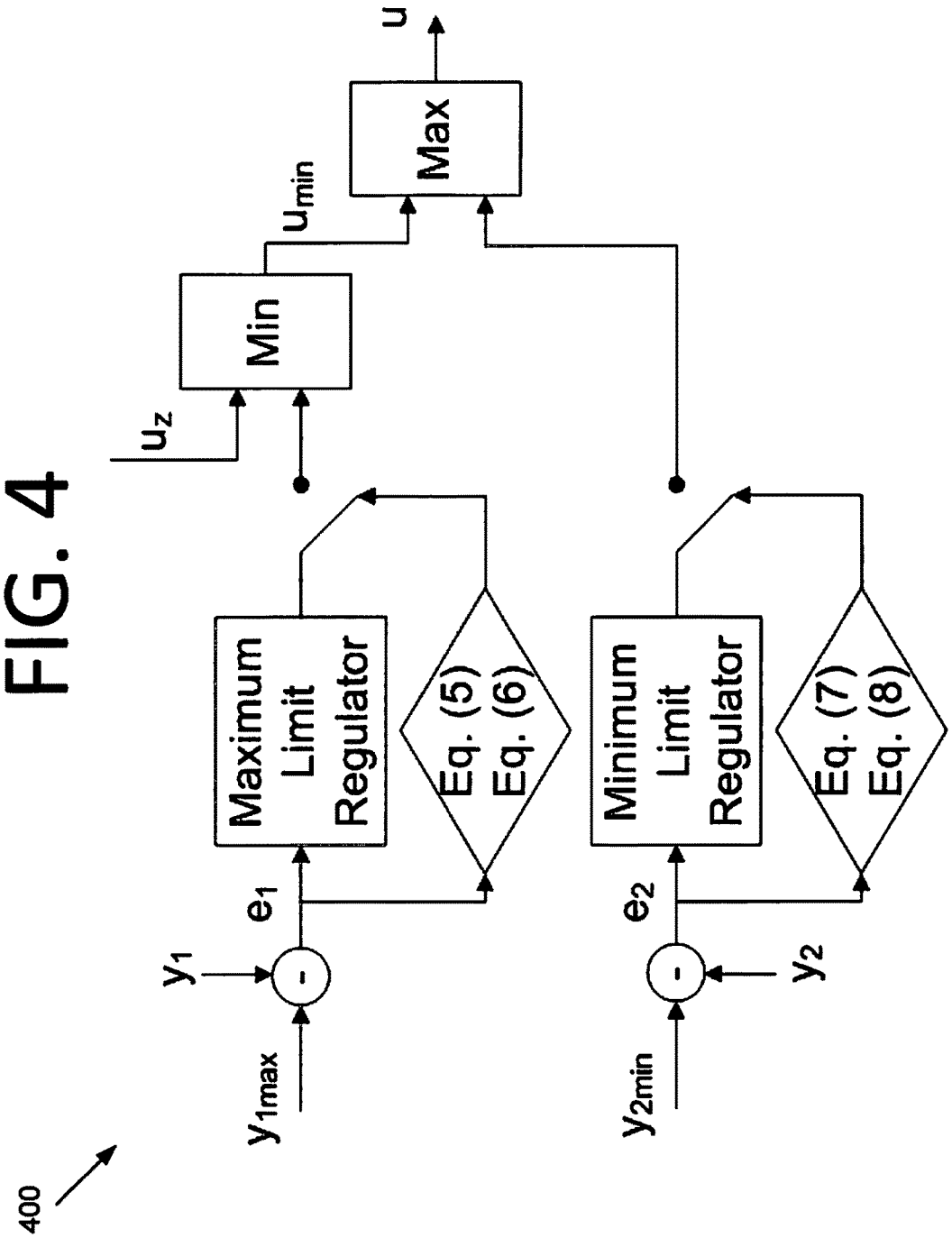
FIG. 4 illustrates the generic Min-Max scheme of FIG. 2 modified to include conditionally active (CA) limit regulators, according to an embodiment of the present invention.

When implemented in the generic Min-Max regulation scheme 200 of FIG. 2, CA limit regulator architecture 400 is shown in FIG. 4. The switches shown on the output of each limit regulator only connect to the Max and Min selector blocks when both bounding conditions are true, i.e., Eq. (5) and Eq. (6) for the Max limit regulator and Eq. (7) and Eq. (8) for the Min limit regulator. The rest of the system shown in FIG. 2 remains unchanged. As most control laws are implemented in a digital processor, such as processor(s) 2010 of FIG. 20, it may be beneficial to develop discrete-time versions of these equations. The discrete versions of the maximum limit inequalities Eq. (5) and Eq. (6) are listed below, where e[k] refers to the error at the current time index and e[k−1] refers to the error at the previous time step.

$$e_1[k] \leq \alpha_1 * y_{1max} \quad (9)$$

$$\frac{1}{\Delta T}(e_1[k] - e_1[k-1]) \le \frac{-e_1[k]}{\beta_1 * \Delta T} \qquad (10)$$

Also, the designer may find it desirable to use a filtered version of e[k] to reduce noise. For the case of a minimum limit, discrete time equations are developed in a similar manner, as shown below.

$$e_2[k] \ge -\alpha_2 * y_{2min} \qquad (11)$$

$$\frac{1}{\Delta T}(e_2[k] - e_2[k-1]) \ge \frac{-e_2[k]}{\beta_2 * \Delta T} \qquad (12)$$

Thus, two parameters are given that adjust the size of the region in which the limiter (i.e., limit regulator) will be active. For parameters that rapidly change value, a large $\alpha$ and/or $\beta$ may be needed to allow the limit regulator to become active early enough to arrest the behavior.

Empirical Method for Choosing Conditional Bounds

The next section explores an empirical approach to choosing conditional bounds. This empirical approach also allows for limit regulators in other engines or limit regulated systems. Empirically tuning the conditional bounds, $\alpha$ and $\beta$, may be done one at a time. The derivative term may be disabled and a suitable proportional gain chosen. The choice of $\alpha$ may be made by selecting a value as small as possible that produces a "safe" outcome in the worst-case situation. The derivative term may then be tested at various values and the smallest value that produces a safe transient may be selected.

The engine simulation used for the purposes of the following examples is the publicly available C-MAPSS40k developed by NASA. This is a simulation of a generic high-bypass, twin-spool, commercial aircraft engine in the 40,000 lbf thrust class. However, any suitable engine simulation may be used. The simulation includes a realistic baseline engine controller against which to compare the performance with the CA limit regulators. The use of this realistic controller allows for any arbitrary throttle transient to be simulated. Additionally, the controller has realistic surge margin models that include the impact of engine deterioration, changes in compressor tip clearance, and heat transfer between the compressor and the casing. C-MAPSS40k also allows for studying the effects of engine degradation through implementation of a set of adjustable health parameters representing performance deterioration within each of the major rotating engine components. The simulation is constructed to allow the user to choose the engine pressure ratio (EPR) or fan speed (Nf) as the main regulated variable to command thrust changes through the throttle. For the purposes of this disclosure, EPR will be used as the main regulated variable.

Figure 1:
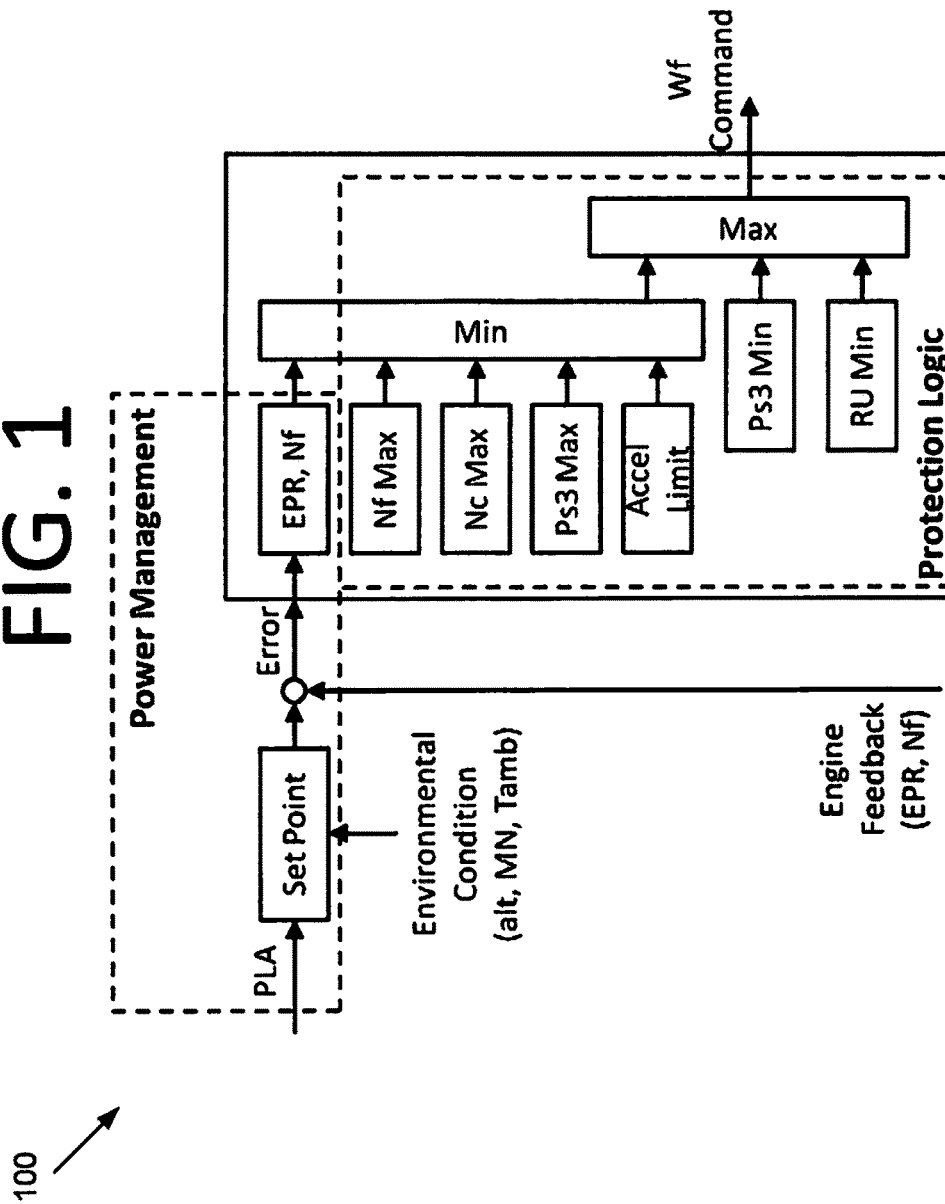
FIG. 1 illustrates a C-MAPSS40k engine control system with throttle (PLA) input and fuel flow rate (Wf) command output.

The Min-Max architecture used in C-MAPSS40k is shown in system 100 of FIG. 1. The maximum limit regulators used are Nf Max, Nc Max, Ps3 Max, and Accel limit, while the two minimum limit regulators are Ps3 Min and RU Min. The fan speed and core speed maximum limiters are to prevent over-speed conditions on the two shafts. The Ps3 maximum limit prevents combustor over-pressurization and the RU (fuel flow rate divided by Ps3) minimum limit is used to ensure that lean blow-out conditions do not occur and to prevent low pressure compressor surge. The Ps3 minimum limit is used to set the idle operating limit.

The maximum acceleration limit and the minimum ratio unit limit are designed to ensure safe engine operation during transients, specifically to preserve compressor surge margin. During engine acceleration, the High Pressure Compressor (HPC) is likely to surge, and the acceleration limit regulator is designed to prevent HPC surge. During engine deceleration, the Low Pressure Compressor (LPC) is more likely to surge and the RU limit regulator is designed to prevent LPC surge.

Currently, there is no feasible means of sensing the compressor surge margin on an operating engine. Thus, the acceleration limiter should limit a sensed value that serves as a stand-in for surge margin. There are many different ways to do this. In C-MAPSS40k, the acceleration limiter is applied to maintain HPC surge margin. The acceleration limiter may be implemented by limiting the core shaft acceleration based on the current core shaft speed. The higher the shaft speed, the higher the allowed acceleration. For LPC surge margin, the ratio unit may be used as a stand-in. Thus, the RU limit regulator may ensure that a minimum Wf/Ps3 is maintained at all times in order to preserve the LPC surge margin. These particular limits were chosen for the C-MAPSS40k controller in some embodiments, but are by no means the only limits that are capable of ensuring safe engine operation.

The process for choosing the bounds for the CA limit regulators will be demonstrated for the acceleration limiter and then repeated for the rest of the limiters. The purpose of the acceleration limiter is to prevent High Pressure Compressor (HPC) surge. The distance from surge is measured by surge margin (SM), where a value of zero means that a surge has occurred. In C-MAPSS40k, an HPC surge is most likely to occur on a fully deteriorated engine during a full throttle burst.

Figure 5:
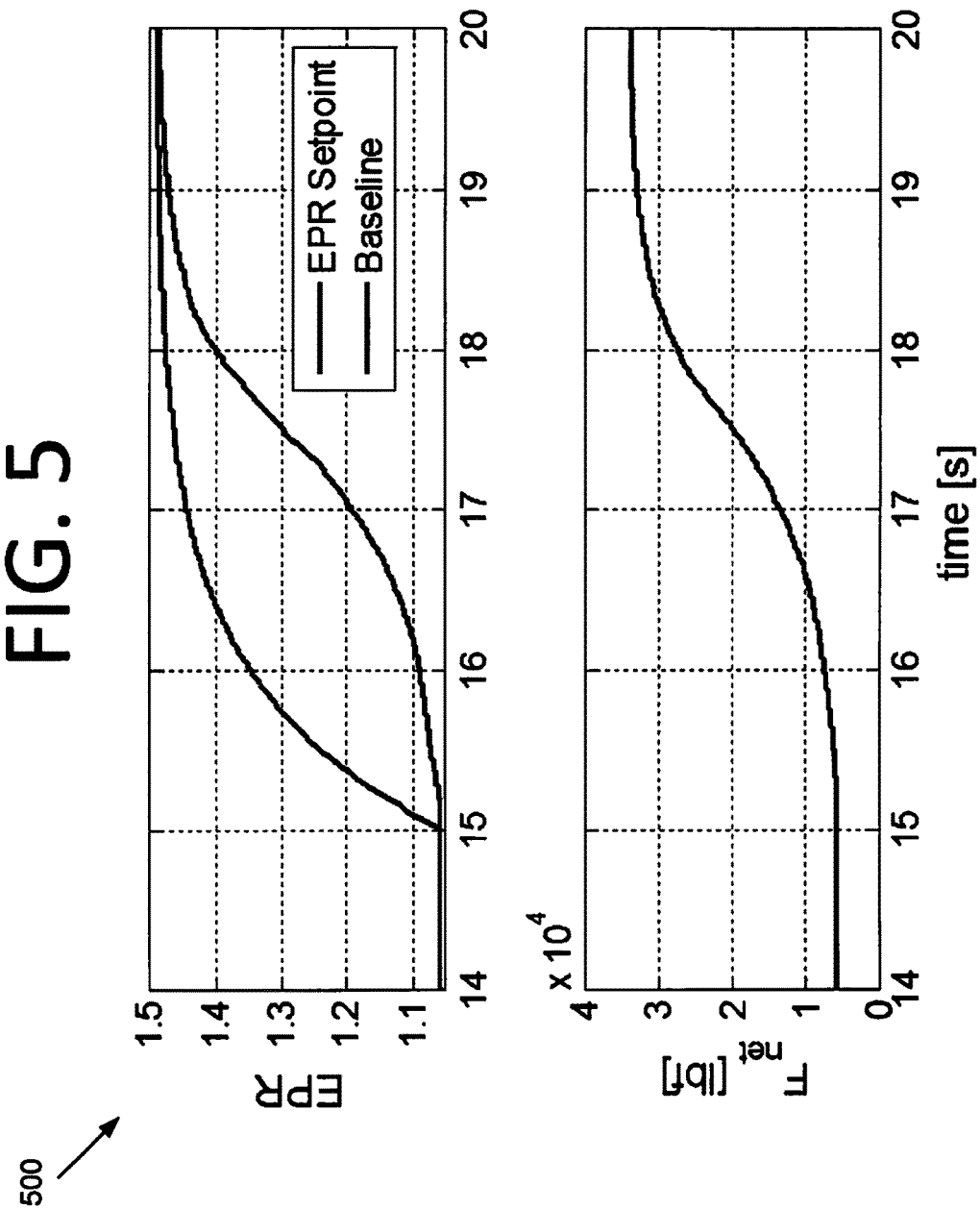
FIG. 5 is a graph illustrating EPR and thrust responses to a full-throttle change at 15 seconds at SLS flight conditions with a fully deteriorated engine, according to an embodiment of the present invention.

An initial look at the engine behavior using the baseline control law may be useful for further understanding the need for conditionally active limit regulators. Graph 500 of FIG. 5 plots the engine pressure ratio (EPR) and net engine thrust ($F_{net}$) for an idle to full throttle transient that starts at 15 seconds. The engine is fully degraded (i.e., the health parameters in the simulation are chosen to correspond to an engine at the end of its useful life, which is the worst-case scenario) and operating at sea-level static (SLS) flight conditions. Graph 500 shows a long delay between the EPR command and the response of the engine with baseline control. This long delay manifests as a slow response in engine thrust.

Figure 6:
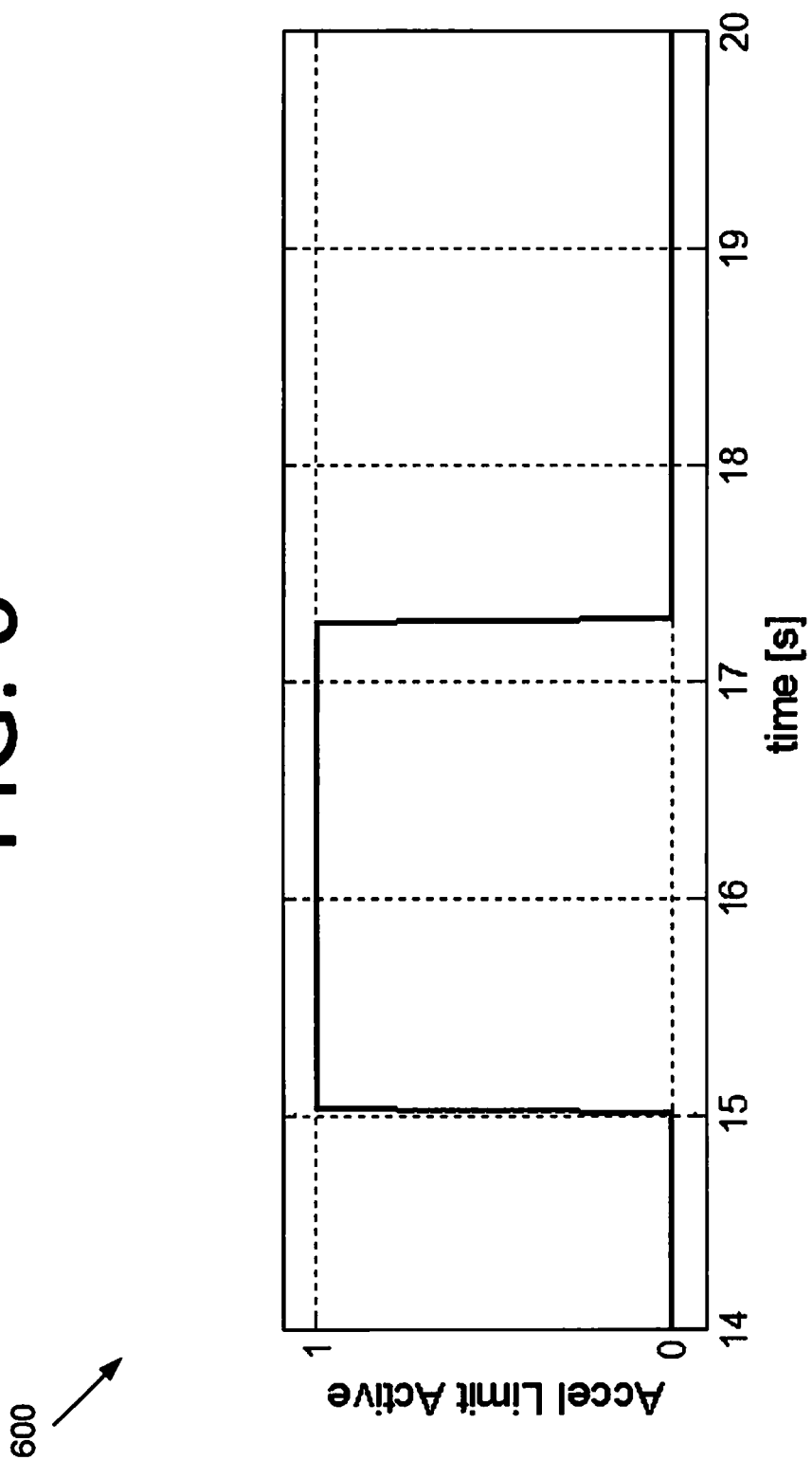
FIG. 6 is a graph illustrating acceleration limit regulator state during a SLS full-throttle burst at 15 seconds with a fully deteriorated engine, according to an embodiment of the present invention.

In order to understand the reason for the long delay, it may be beneficial to look at the state of the acceleration limit regulator as shown in graph 600 of FIG. 6 during the transient. A value of one indicates that the limit regulator is active and overriding the EPR setpoint controller fuel flow rate command in order to preserve the HPC surge margin. It can be seen that the limit regulator is active for more than two seconds almost immediately following the start of the transient.

Figure 7:
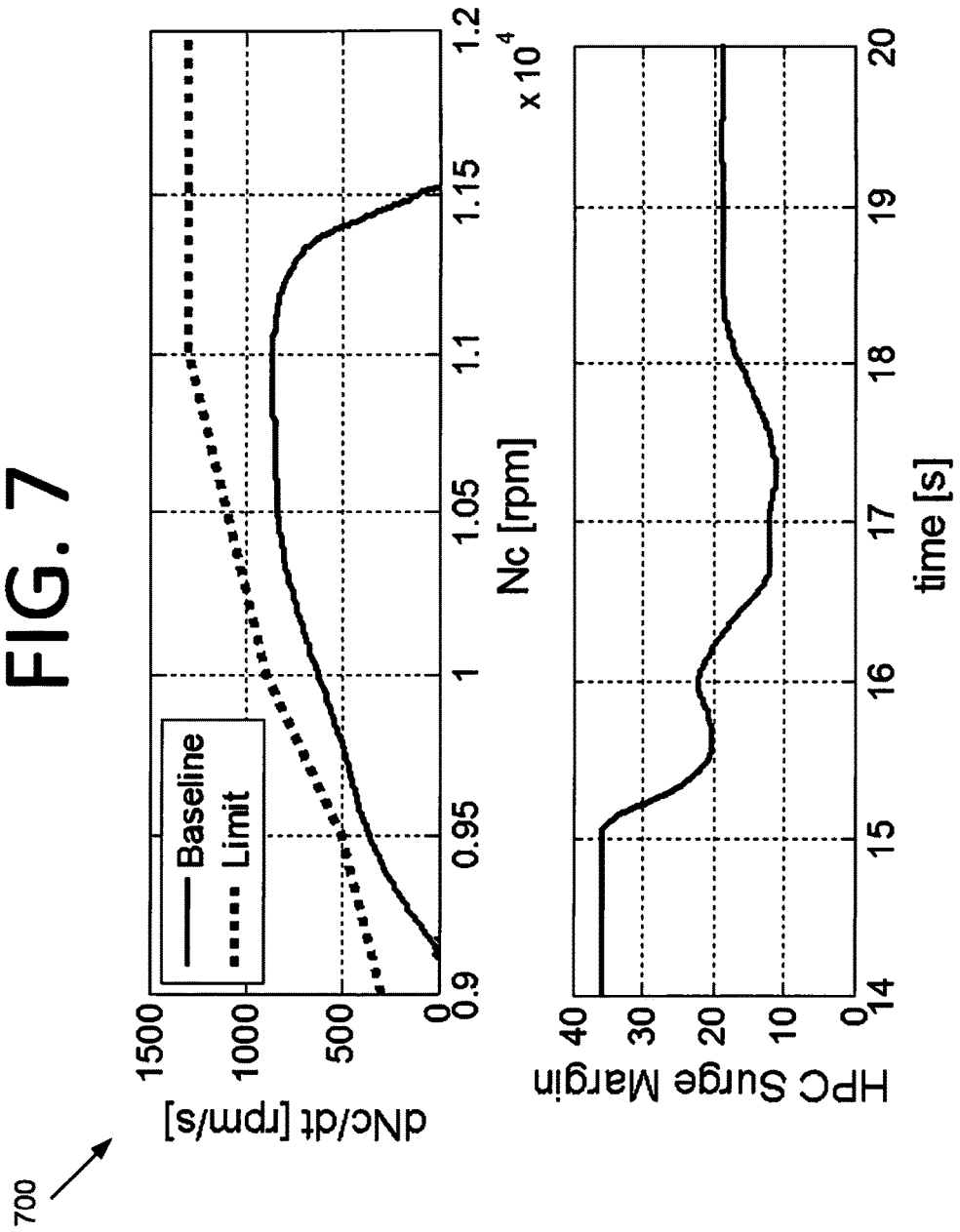
FIG. 7 is a graph illustrating the impact of the Accel limiter during a SLS full-throttle burst at 15 seconds for a baseline controller, according to an embodiment of the present invention.

A pertinent question is whether the acceleration limit regulator needs to be active for this period of time? To answer this question, the core shaft acceleration, which is limited by the acceleration limit, and HPC surge margin are plotted in graph 700 of FIG. 7. The top plot shows the acceleration limit, which for C-MAPSS40k is a limit on dNc/dt based on the current core shaft speed, Nc, which is represented by the dotted line, as well as the actual dNc/dt versus Nc represented by the solid line.

The conservative nature of the baseline limit regulator can be seen from the significant difference between the limit and actual value of the core acceleration. Further, when the HPC surge margin is examined, there is a significant amount of transient surge margin (12%) available. Thus, the acceleration limit regulator does not need to be active for as long as it is, meaning that the transient thrust response is being slowed because of unneeded activation of the acceleration limit regulator. To improve the response, an appropriately tuned conditionally active limit regulator may be used.

To determine an acceptable value of a for a specific limit regulator, the error rate limit condition may be "ignored" and only Condition 1 may be necessary for activation of the CA limit regulator. Thus, to determine an appropriate value of a, the criterion associated with Eq. (5) or Eq. (7) alone may be considered sufficient to activate that particular regulator. As an example, for the case of the acceleration limiter, various values of a may be tested for the impact on being able to stay within the HPC surge limit. Note that "ignoring" the error rate limit condition is analogous to setting $\beta$ to infinity in Eq. (6) or Eq. (8).

Figure 8:
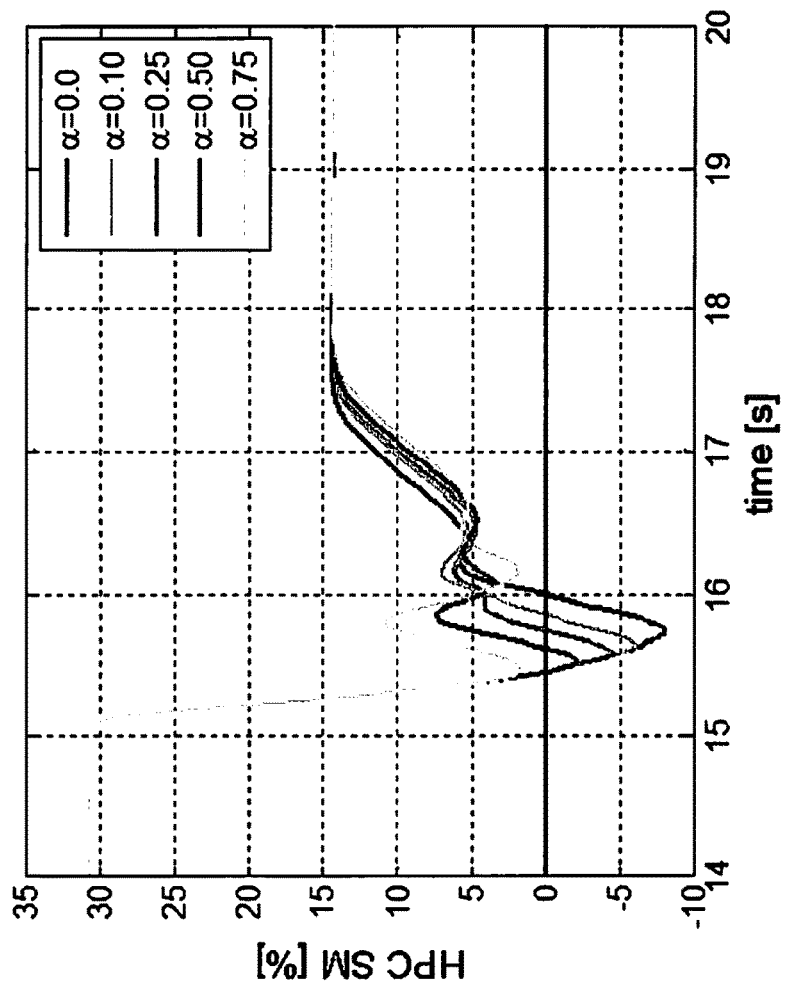
FIG. 8 is a graph illustrating the HPC surge margin for various choices of a on the acceleration limiter (β fixed at infinity) with a full-throttle burst at 15 seconds at SLS conditions and a fully deteriorated engine, according to an embodiment of the present invention.

The HPC surge margin for various values of a with the fully deteriorated engine and the throttle command as before is plotted in graph 800 of FIG. 8. Here, all values of a less than 0.75 result in the CA limit regulator not being able to prevent HPC surge. Note that while the remaining surge margin with $\alpha=0.75$ is small (approximately 2%), it is considered sufficient as it is greater than zero. This is because the C-MAPSS40k simulation includes transient surge margin models that take into account engine deterioration, changes in compressor tip clearance, heating effects, and transient operation. In an actual engine design, the amount of remaining surge margin would likely need to be higher to account for engine-to-engine variation, inlet distortion effects, and modeling uncertainties.

Figure 9:
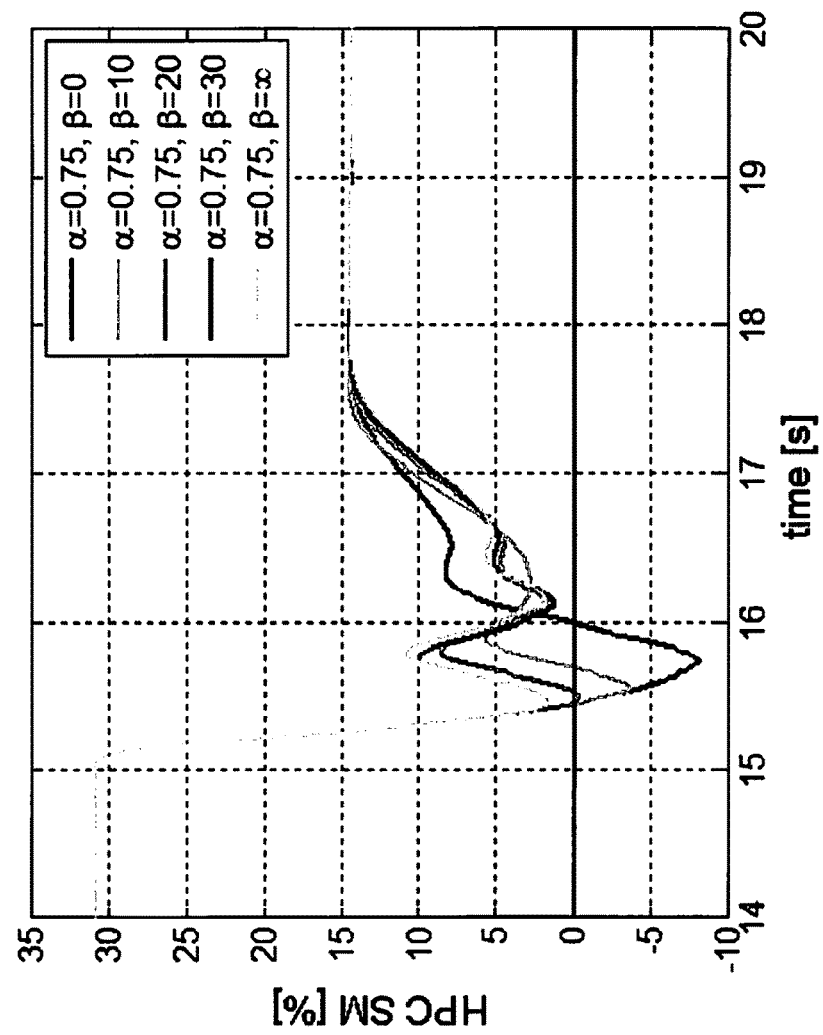
FIG. 9 is a graph illustrating the HPC surge margin for various choices of β on the acceleration limiter (a fixed at 0.75) with a full-throttle burst at 15 seconds at SLS conditions and a fully deteriorated engine, according to an embodiment of the present invention.

With the value of $\alpha$ fixed at 0.75, the effect of error rate on the limit regulator being active is considered as $\beta$ is varied. Based on how $\beta$ is defined, the larger the value of $\beta$, the more sensitive the limiter activation will be to small deviations from the limit. In graph 900 of FIG. 9, the impact of changing $\beta$ on the HPC surge margin is shown. Note that as $\beta$ is increased, the closer graph 900 follows the $\beta=\infty$ curve. The choice of $\beta=30$ produces a safe transient. Increasing the value any further would likely serve to make the limiter too sensitive to noise or other disturbances.

Although performance can be improved by adjusting the acceleration schedule itself, doing so will increase the risk of surge under extreme conditions. The acceleration schedule is designed to ensure that adequate surge margin will be maintained under all allowable operating conditions as long as the core shaft acceleration limit is not exceeded. Thus, the CA limit regulator provides the capability to achieve improved performance by allowing the engine to operate closer to the acceleration limit that guarantees adequate surge margin. This process of determining the limit activation parameters $\alpha$ and $\beta$ may then be repeated for each of the other engine limit regulators. This may result in the choice of parameter values as shown in Table 2.

TABLE 2

CONSTANTS FOR FIVE CA LIMITERS IN C-MAPSS40k

| Limiter | α | β |
|---|---|---|
| Accel | 0.75 | 30 |
| Nf Max | 0.10 | 20 |
| Nc Max | 0.20 | 20 |
| Ps3 Max | 0.20 | 20 |
| Ps3 Min | 0.20 | 20 |

Engine Performance with Conditionally Active Limit Regulators

To determine the effectiveness of the conditionally active limit regulators on the engine response, three situations are evaluated: (1) a case where a transient limit regulator is necessary to ensure safe operation; (2) a case where a steady-state limit regulator is necessary to ensure safe operation; and (3) a case where a limit regulator becomes active unnecessarily during a transient. During testing, it was discovered that the C-MAPSS40k EPR setpoints are very conservative and, during normal operation, only the acceleration limiter is typically encountered. As such, other simulations may address this by developing a more aggressive EPR setpoint schedule in which the limiters act to bound the envelope of operation. For the purposes of this example, case 1 evaluates the performance of the acceleration limiter while the core speed limiter evaluates both case 2 and case 3.

Figure 10:
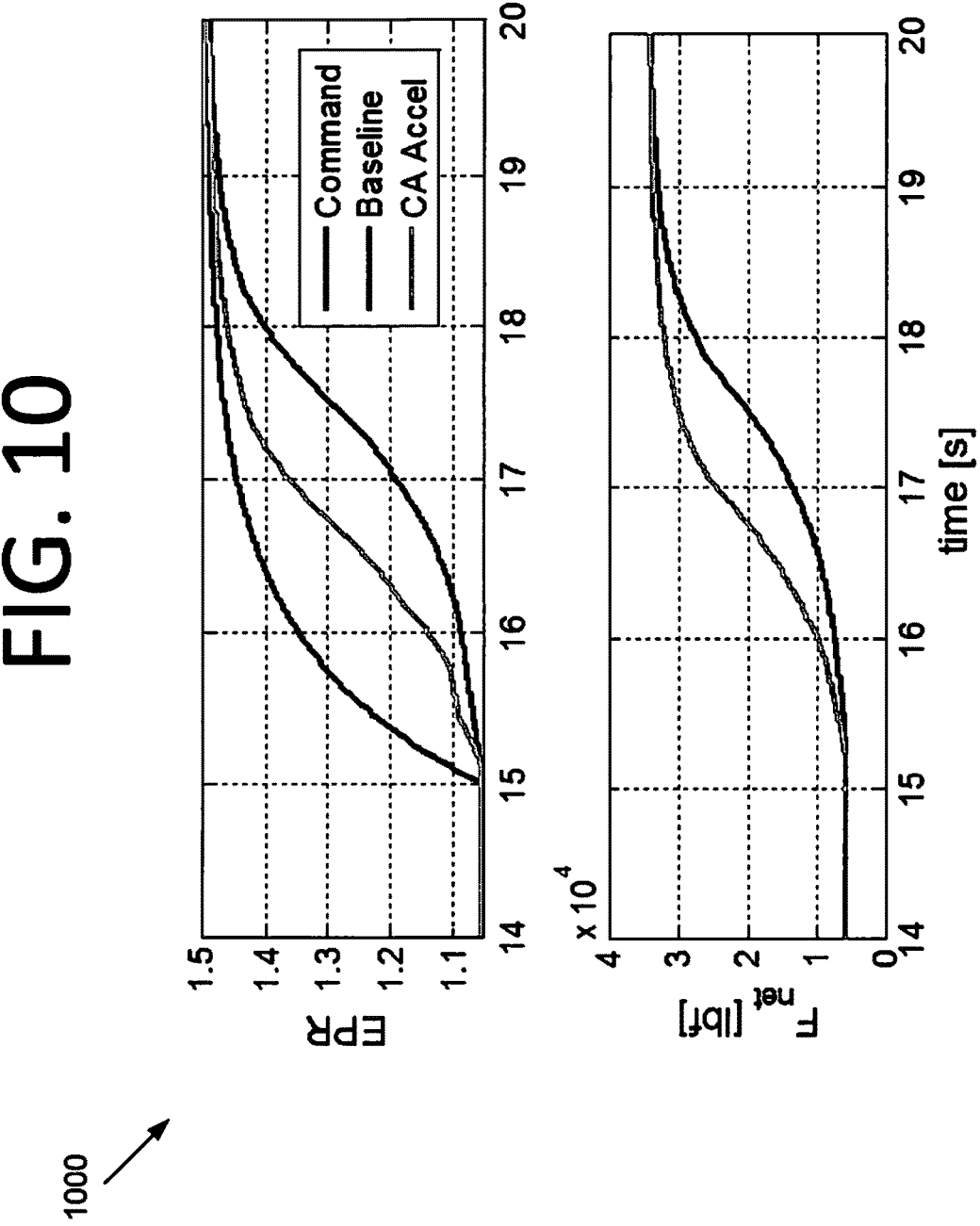
FIG. 10 is a graph illustrating EPR and thrust responses to a full throttle change at 15 seconds at SLS flight conditions with a fully deteriorated engine, according to an embodiment of the present invention.
Figure 11:
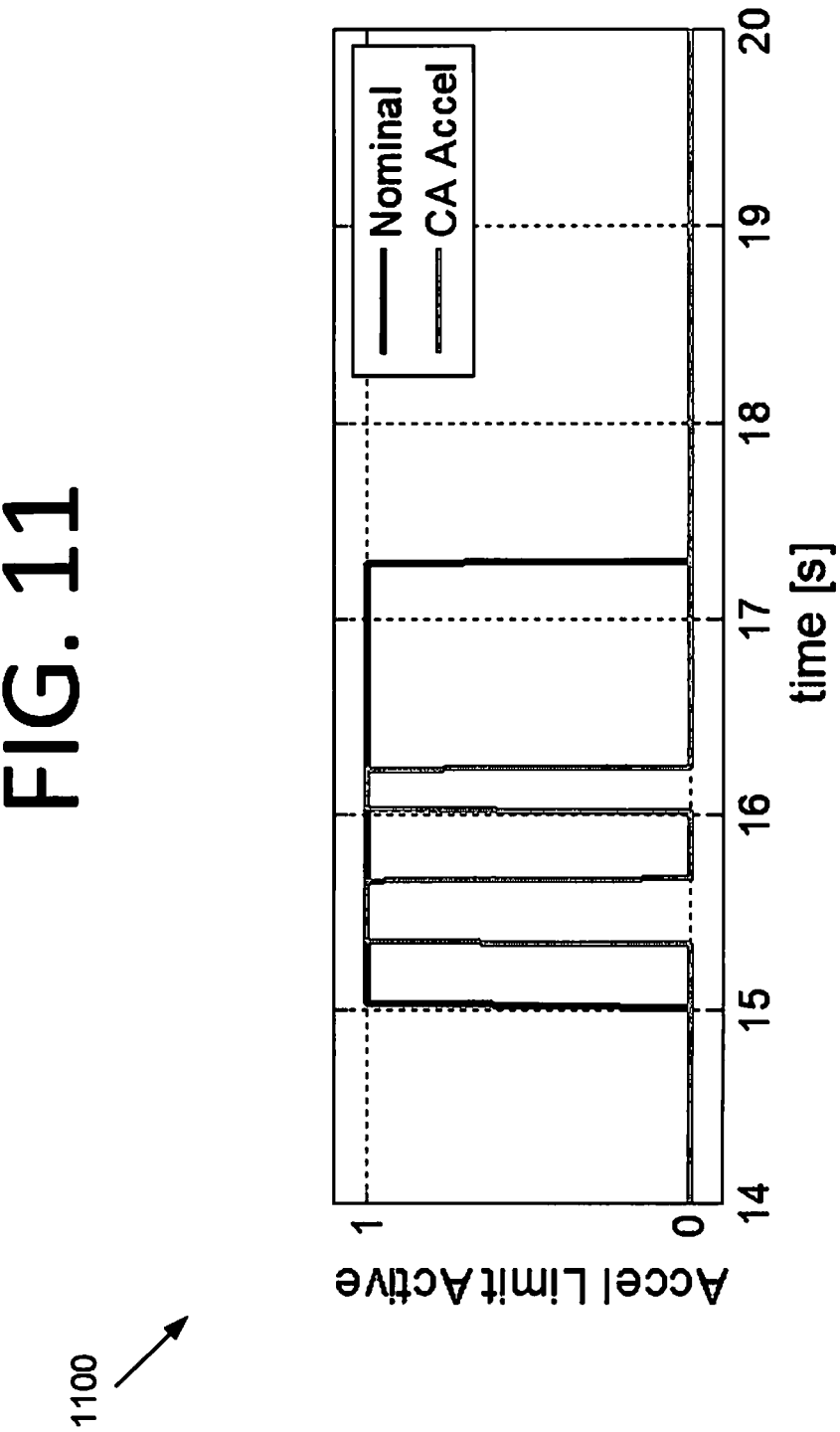
FIG. 11 is a graph illustrating acceleration limit regulator state during a SLS full-throttle burst at 15 seconds with a fully deteriorated engine for both baseline and CA limiters, according to an embodiment of the present invention.

To evaluate case 1, a step throttle change is commanded at 15 seconds to an engine with the baseline control law and one in which the conditionally active limiters are installed. The engine is fully degraded to test a worst-case scenario. The throttle change is commanded internally as an EPR (engine pressure ratio) command as shown in graph 1000 of FIG. 10 for both the baseline control law and the controller utilizing CA limit regulators. The 90% rise time for the baseline case is 3.47 seconds compared to 2.79 seconds for the case with the CA limit regulators—a reduction of nearly 20%. This corresponds with the finding in graph 1100 of FIG. 11 that the baseline acceleration limit regulator is active for 2.28 seconds, whereas the CA limit regulator is only active for a total of 0.54 seconds during two periods.

Figure 12:
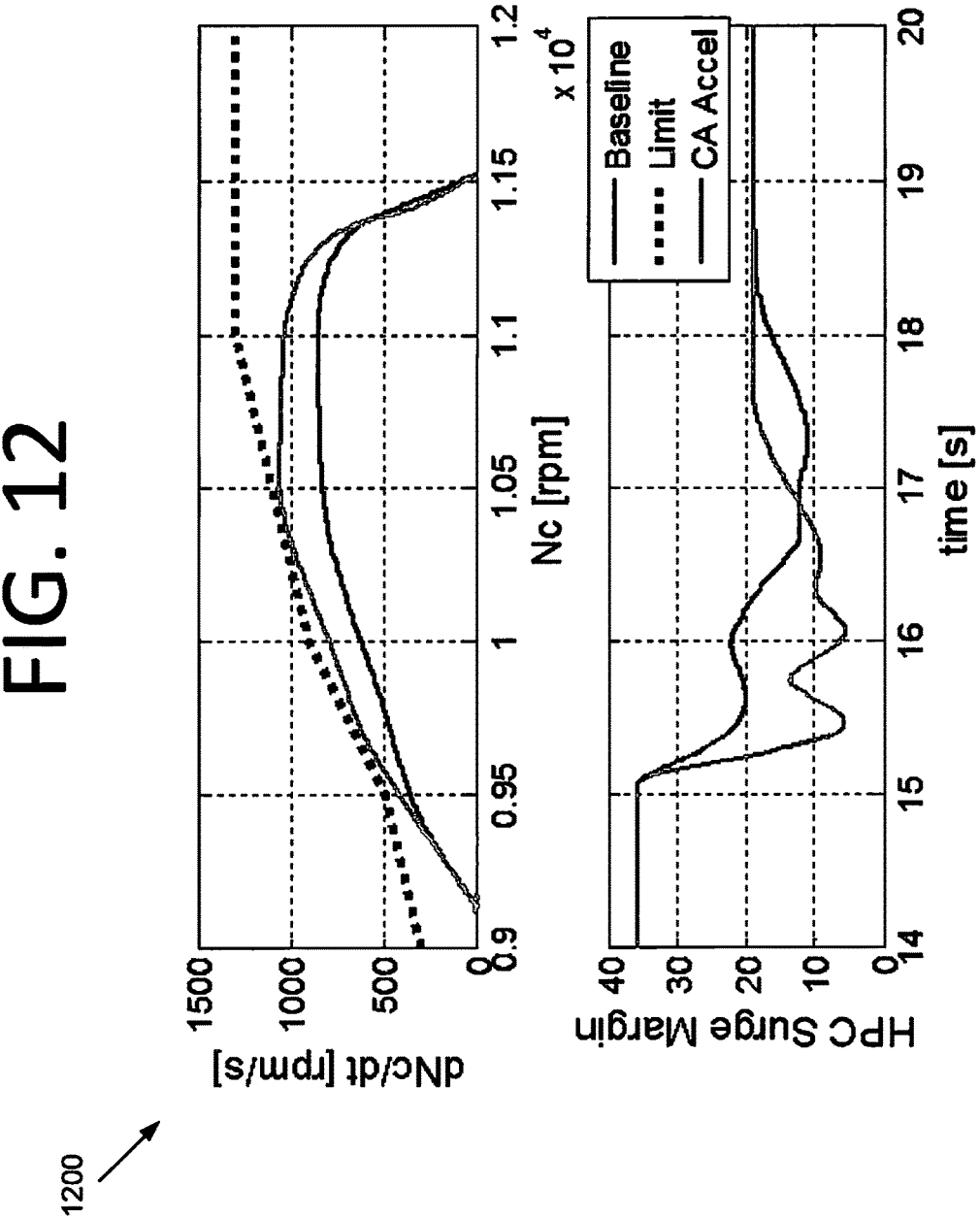
FIG. 12 is a graph illustrating the impact of the Accel limiter during a SLS full-throttle burst at 15 seconds for a baseline controller and a controller with conditionally active limiters, according to an embodiment of the present invention.

Examining the HPC surge margin for both cases with reference to graph 1200 of FIG. 12 highlights the fact that in the baseline case, the engine controller behaves in a conservative manner (i.e., the surge margin is much greater than zero during the transient). The use of the CA limiters reduces this conservatism while maintaining a positive surge margin. Additionally, the core shaft acceleration versus core shaft speed is plotted in graph 1200. Again, the inherent conservatism of the baseline limiter can be seen. This conservatism is removed when the CA limiter is used, resulting in much higher accelerations, and thus faster engine response.

In addition to studying the fully deteriorated engine, the same test was conducted with a new engine. The results are nearly identical to those shown in FIGS. 10-12 with the single exception that the HPC surge margin is approximately 3% higher for all cases when using a new engine. Due to the similar nature of the results, the plots are not included in this disclosure.

Case 2 studies the behavior of the engine when a steady-state limit, such as a core shaft speed limit, is encountered. For this case, a flight condition of 10,000 ft, Mach 0.8, and ISA+50 R may be used. Again, an idle to full throttle transient may be executed with the baseline control system and the conditionally active limiters. For this case, the engine is considered to be new, that is, all health parameter deviations are set to zero to indicate no deterioration.

Figure 13:
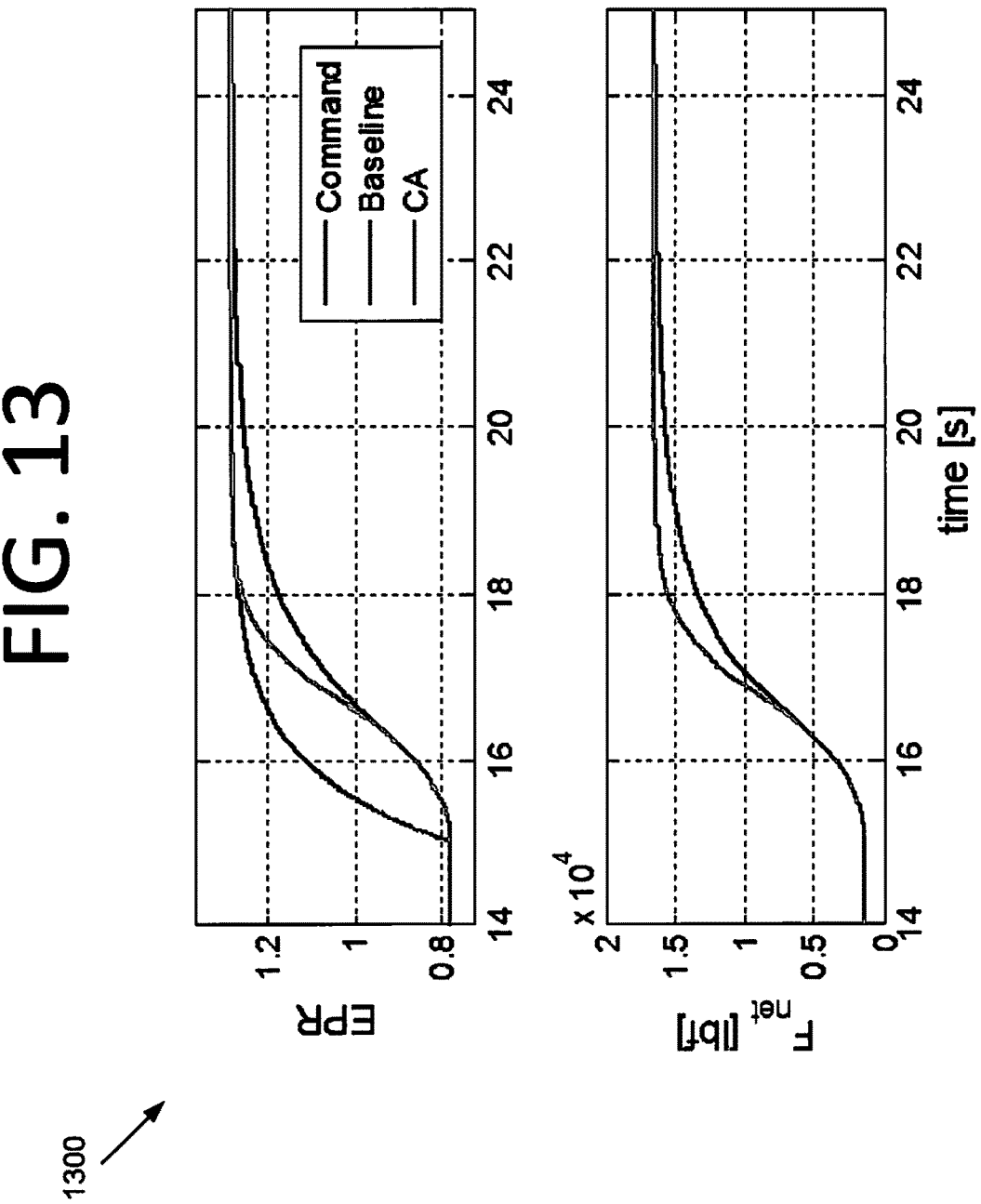
FIG. 13 is a graph illustrating EPR and net thrust generated by the engine during a full throttle transient at 15 seconds (10,000 ft, Mach 0.8, ISA+50 R) for a baseline controller and controller with CA limiters, according to an embodiment of the present invention.

The EPR and net thrust responses with the baseline control and the CA limit regulators are shown in graph 1300 of FIG. 13. The benefit of using the CA limit regulator is apparent from the results in graph 1300. In this case, the 90% rise time is reduced from 5.05 seconds to 2.68 seconds. Also, it should be noted that there is a steady-state EPR error of 0.004 that cannot be seen in the plot at this scale. This error is due to the fact that the core speed limit regulator is active and preventing the EPR setpoint from being attained.

Figure 14:
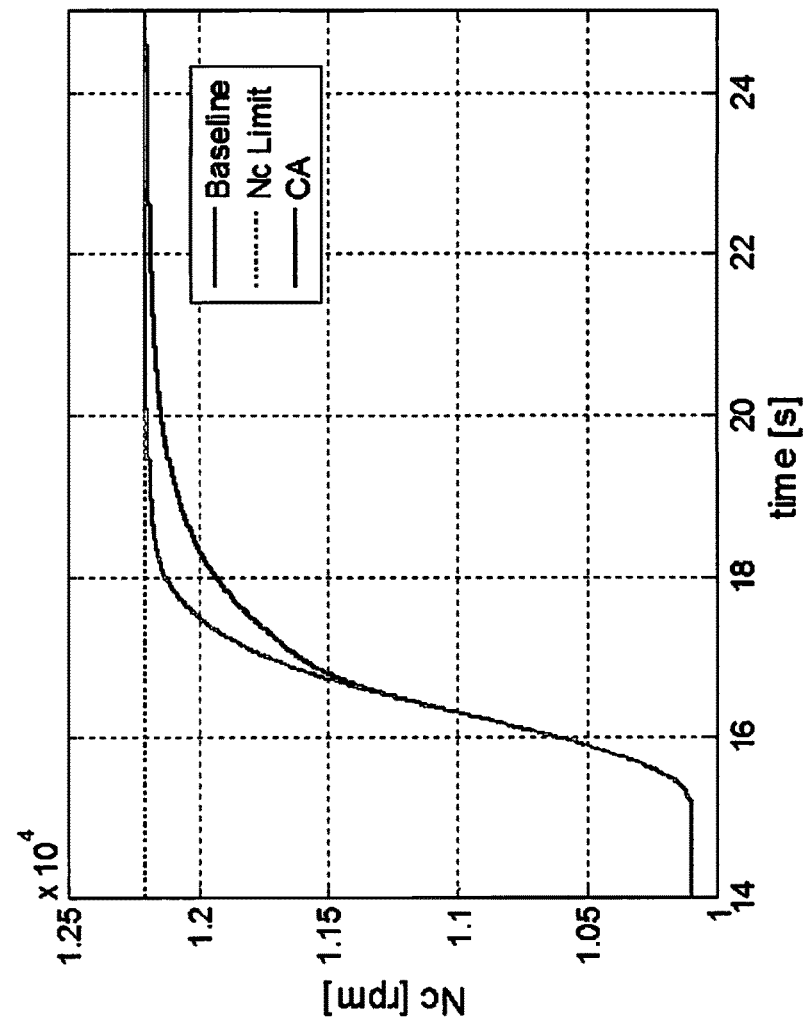
FIG. 14 is a graph illustrating core shaft speed and limit for a full-throttle burst at 15 seconds (10,000 ft, Mach 0.8, ISA+50 R), according to an embodiment of the present invention.

The fact that the core shaft speed hits the limit and remains there after the transient is shown in graph 1400 of FIG. 14. Shown are the core shaft speed responses as well as the core speed limit. It should be noted that the core speed limit is the same for both configurations. It can be seen that the CA limit regulator case reaches the limit much faster than the baseline case. For both cases, the core shaft speed limit is maintained and there are no oscillations.

Figure 15:
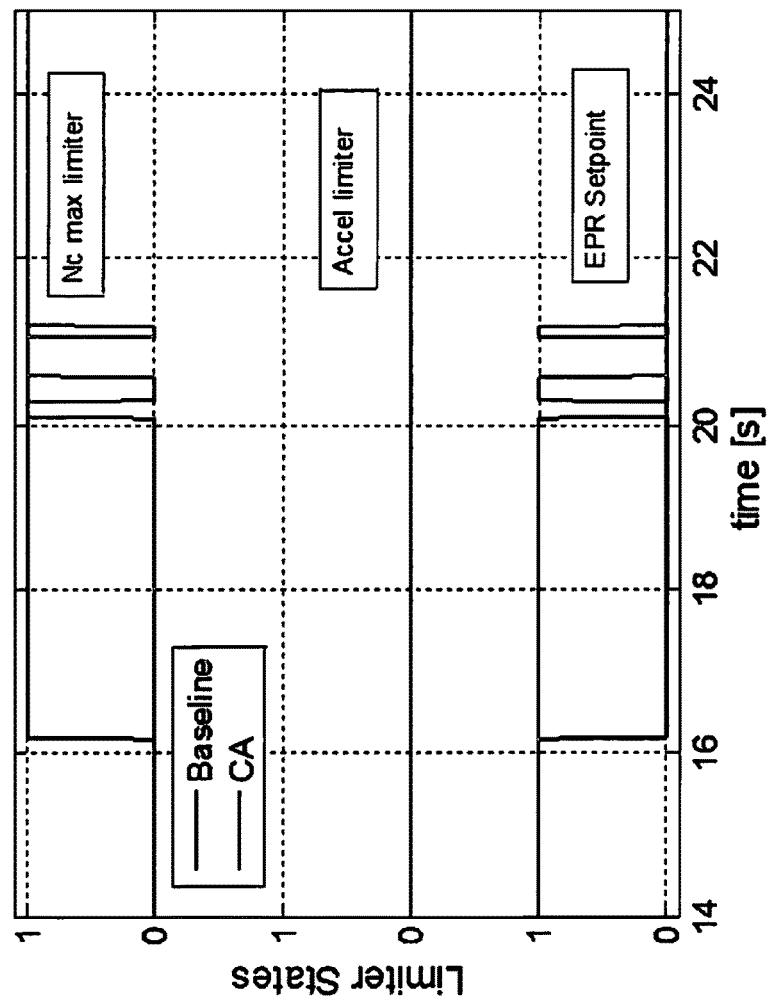
FIG. 15 is a graph illustrating the state of the core shaft speed limiter, acceleration limiter, and EPR setpoint controller during a full-throttle burst at 15 seconds (10,000 ft, Mach 0.8, ISA+50 R), according to an embodiment of the present invention.

To examine the impact of the CA limiter, the state of the Nc Max limiter and Accel limiter are plotted along with the state of the EPR setpoint controller in graph 1500 of FIG. 15. Due to the nature of the Min-Max architecture, only one of these can be active at any given time. In the baseline case, the EPR setpoint controller drives the transient for approximately the first 1.2 seconds and then the core speed limiter takes over. Note that at this point, the core speed is only 10,860 rpm while the limit is 12,200 rpm. By comparison, with the CA limiters, the Nc Max limiter does not become active until five seconds after the transient when the core speed is approximately 4.0 rpm below the limit. There is some chatter in the state of the Nc Max limit regulator as the changing control action results in the error rate criteria (Eq. (6)) becoming false, then true as the EPR setpoint regulator assumes control. While there are no observed negative effects of this chatter, some hysteresis can be added to the CA logic to smooth out the control action.

Case 3 is now evaluated, in which a steady-state limiter is unnecessarily active for the baseline controller. This is analogous to the temperature limit prematurely limiting the response. Here, the test is conducted at a flight condition of 15,000 ft, Mach 0.8, and ISA+50 R with a new engine.

Figure 16:
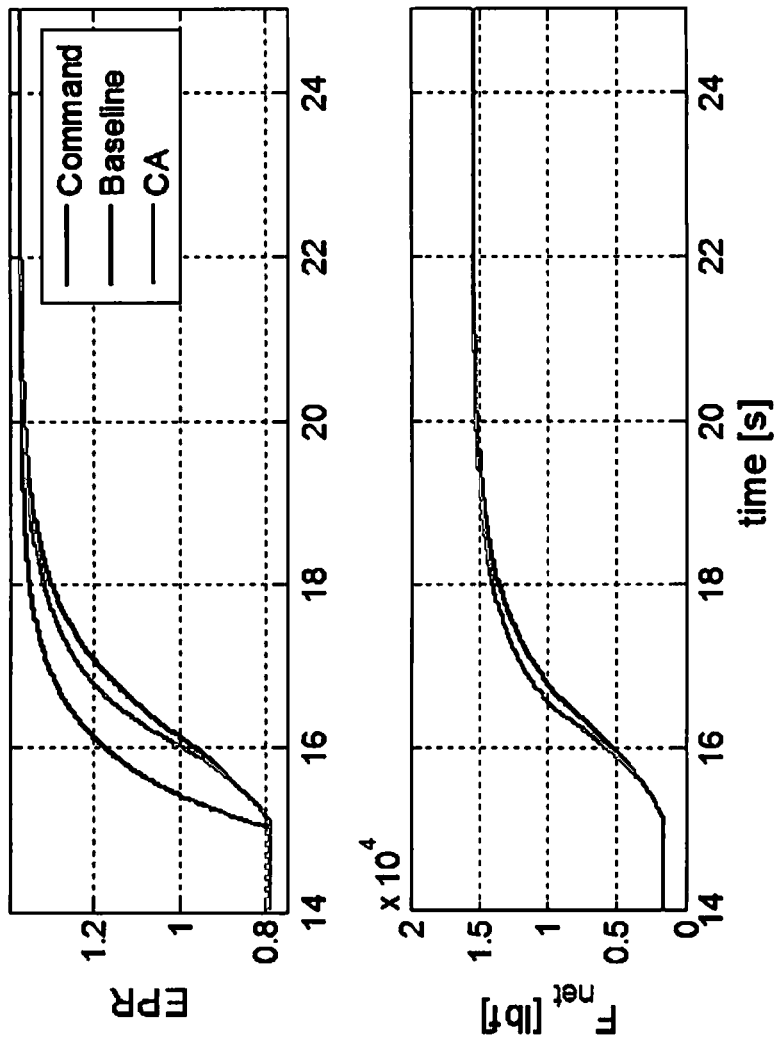
FIG. 16 is a graph illustrating the EPR and net thrust generated by engine during a full-throttle transient at 15 seconds (15,000 ft, Mach 0.8, ISA+50 R) for a baseline controller and controller with CA limiters, according to an embodiment of the present invention.

The EPR and net generated thrust are shown for the baseline controller and controller with CA limit regulators in graph 1600 of FIG. 16. There is a small improvement in engine response since the 90% rise time decreases from 3.22 seconds to 2.95 seconds (an 8.4% reduction).

Figure 17:
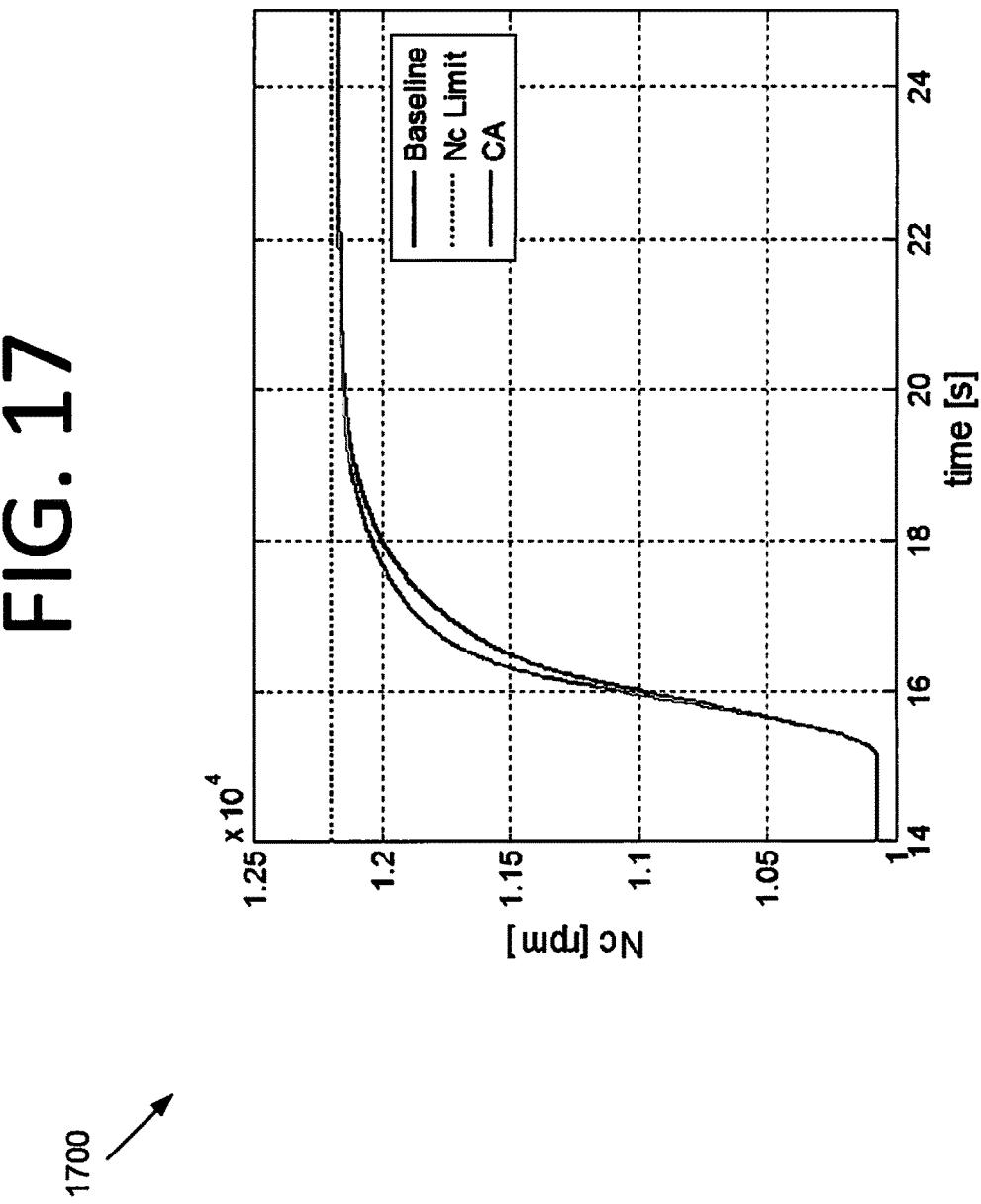
FIG. 17 is a graph illustrating core shaft speed and limit for the baseline controller and controller with CA limiters for a full-throttle burst at 15 seconds (15,000 ft, Mach 0.8, ISA+50 R), according to an embodiment of the present invention.

The core shaft speeds for both controller configurations are plotted in graph 1700 of FIG. 17, along with the core speed limit. It is apparent that in both cases, the physical limit is never encountered during the transient or at the new operating point. Thus, the core speed limit regulator has no need to become active.

Figure 18:
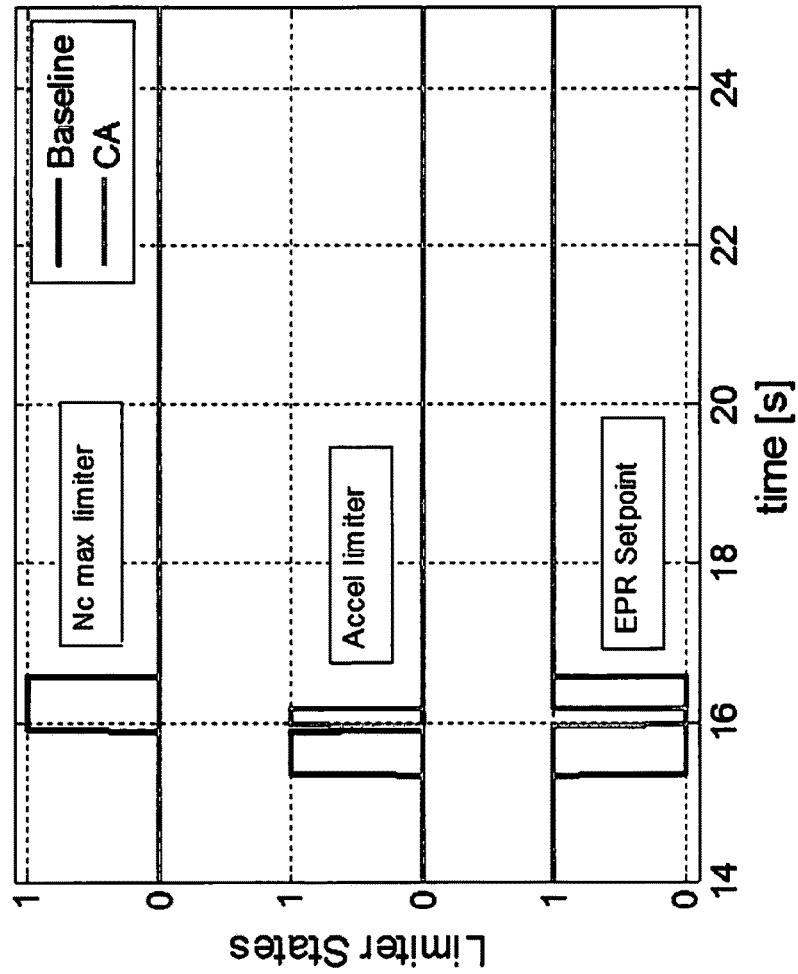
FIG. 18 is a graph illustrating the state of the core shaft speed limiter, acceleration limiter, and EPR setpoint controller during a full-throttle burst at 15 seconds (15,000 ft, Mach 0.8, ISA+50 R), according to an embodiment of the present invention.

Graph 1800 of FIG. 18 shows the state of the Nc Max limiter, the Accel limiter, and the state of the EPR setpoint controller for the two controller configurations. When using the baseline controller, the Nc Max limiter is indeed active for 0.66 seconds. When the CA limiters are used, the core speed limit regulator never becomes active. Additionally, the amount of time spent on the acceleration limiter is greatly reduced when using the CA limiters (0.19 seconds compared to 0.53 seconds for the baseline).

In the three cases evaluated, the engine controller using CA limit regulators has been shown to result in faster engine response while ensuring engine safety. The improved performance is attained by eliminating unnecessary limit regulator activations and by utilizing more of the available safety margins. These cases demonstrate some of the benefits of using CA limit regulators.

CA Limit Regulation Process

Figure 19:
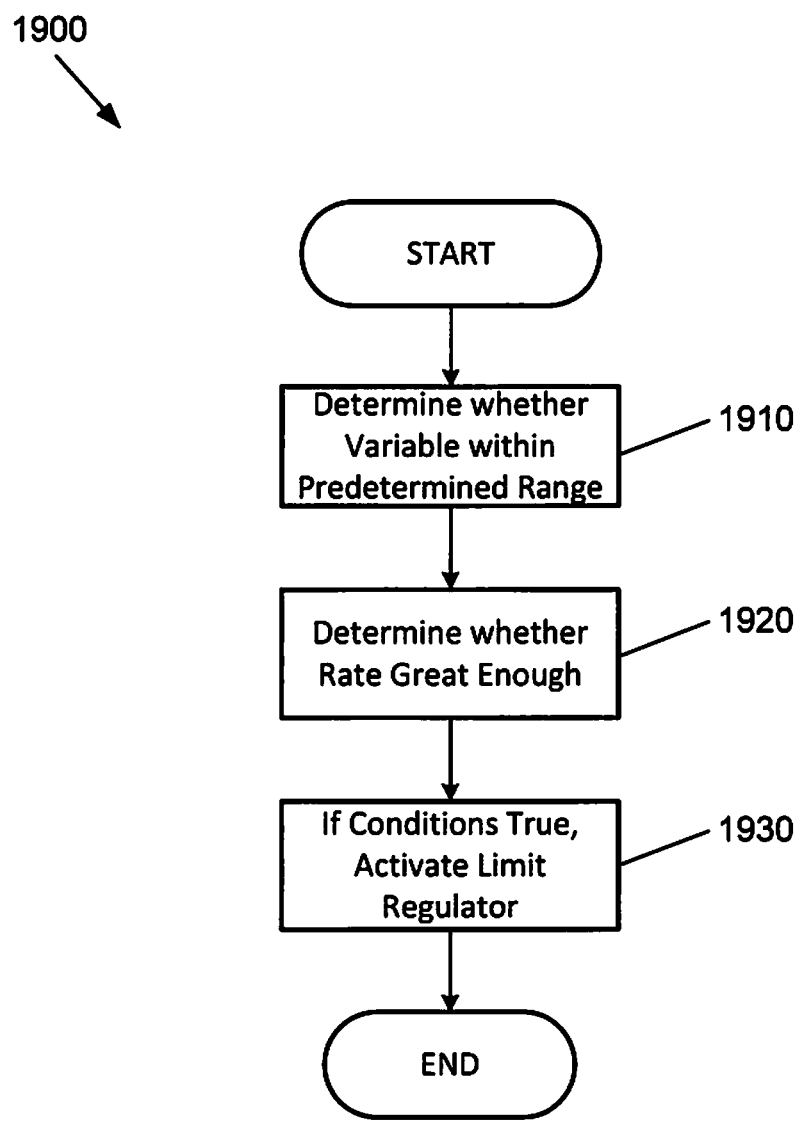
FIG. 19 is a flowchart illustrating a method for a CA limit regulator, according to an embodiment of the present invention.

FIG. 19 is a flowchart 1900 illustrating a method for a CA limit regulator, according to an embodiment of the present invention. In some embodiments, the method of FIG. 19 may be implemented by computing system 2000 of FIG. 20. The method begins with determining whether a variable to be limited is within a predetermined range of a limit value as a first condition at 1910. In the case of a maximum limit regulator, Eq. (5) may be used for the non-discrete case and Eq. (9) may be used for the discrete case. In the case of a minimum limit regulator, Eq. (7) may be used for the non-discrete case and Eq. (11) may be used for the discrete case.

Next, it is determined whether a current rate of increase or decrease of the variable to be limited is great enough that the variable will reach the limit within a predetermined period of time with no other changes as a second condition at 1920. In the case of a maximum limit regulator, Eq. (6) may be used for the non-discrete case and Eq. (10) may be used for the discrete case. In the case of a minimum limit regulator, Eq. (8) may be used for the non-discrete case and Eq. (12) may be used for the discrete case.

When both the first and second conditions are true, a simulated or physical limit regulator is activated at 1930. In some embodiments, this activation may include passing the simulated or physical limit regulator's output through appropriate minimum or maximum selection logic and modifying a command regulating a fuel flow rate to a simulated or physical engine.

Figure 20:
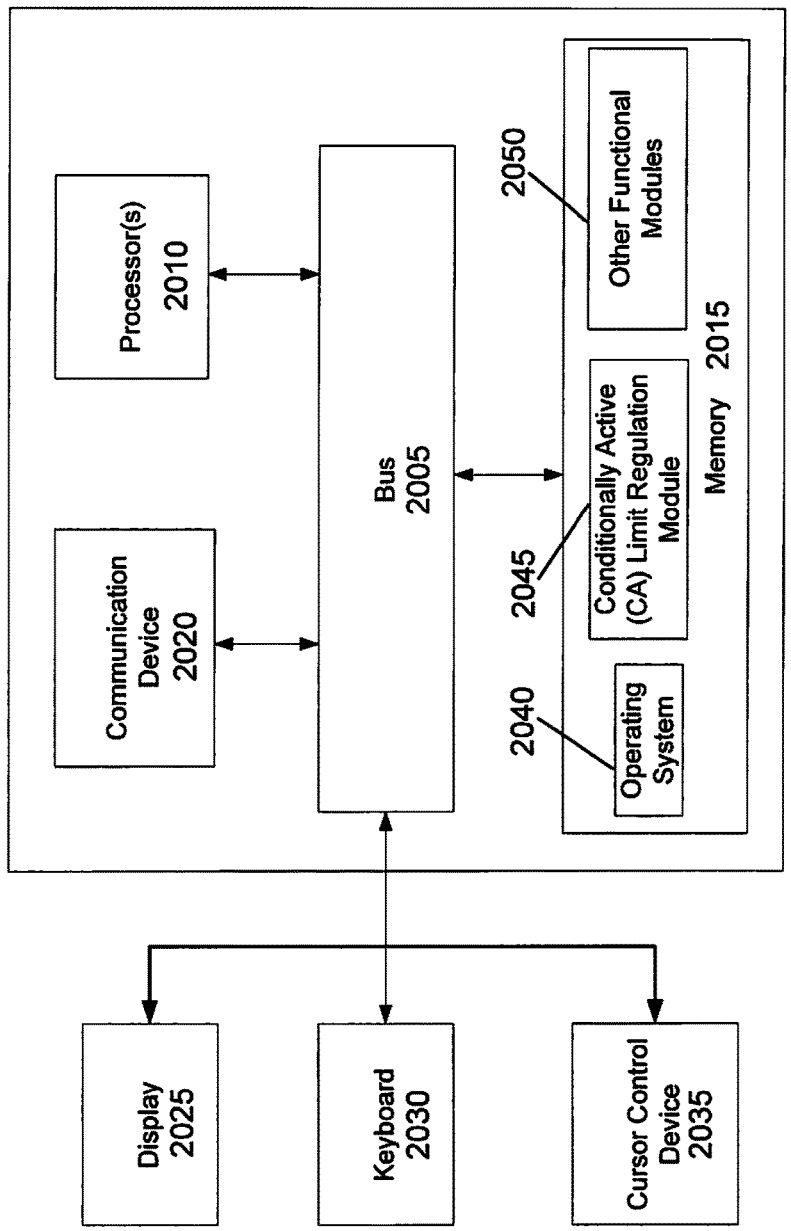
FIG. 20 is a block diagram illustrating a computing system configured to perform CA limit regulation, according to an embodiment of the present invention.

FIG. 20 is a block diagram illustrating a computing system 2000 configured to perform CA limit regulation, according to an embodiment of the present invention. Computing system 2000 includes a bus 2005 or other communication mechanism for communicating information, and processor(s) 2010 coupled to bus 2005 for processing information. Processor(s) 2010 may be any type of general or specific purpose processor, including a central processing unit ("CPU") or application specific integrated circuit ("ASIC"). Processor(s) 2010 may also have multiple processing cores, and at least some of the cores may be configured to perform specific functions. Computing system 2000 further includes a memory 2015 for storing information and instructions to be executed by processor(s) 710. Memory 2015 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 2000 includes a communication device 2020, such as a transceiver, to wirelessly provide access to a communications network.

Non-transitory computer-readable media may be any available media that can be accessed by processor(s) 2010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 2010 are further coupled via bus 2005 to a display 2025, such as a Liquid Crystal Display ("LCD"), for displaying information to a user. A keyboard 2030 and a cursor control device 2035, such as a computer mouse, are further coupled to bus 2005 to enable a user to interface with computing system 2000. However, in certain embodiments such as those implemented onboard aircraft or in other practical systems, a physical keyboard and mouse may not be present, and computing system 2000 may be included as a component of the system, or otherwise configured to monitor and interact with the system.

In one embodiment, memory 2015 stores software modules that provide functionality when executed by processor(s) 2010. The modules include an operating system 2040 for computing system 2000. The modules further include a CA limit regulation module 2045 that is configured to perform conditionally active limit regulation using one or more embodiments of the present invention. Computing system 2000 may include one or more additional functional modules 2050 that include additional functionality.

One skilled in the art will appreciate that a "system" could be embodied as a personal computer, a server, a console, a personal digital assistant ("PDA"), a cell phone, a tablet computing device, an embedded chip, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIG. 19 may be performed by a computer program, encoding instructions for the nonlinear adaptive processor to perform at least the method described in FIG. 19, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIG. 19, which may also be stored on the computer-readable medium. The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifi-

The invention claimed is:

1. A computer-implemented method, comprising:
   determining, by a computing system, whether a variable to be limited is within a predetermined range of a limit value as a first condition;
   determining, by the computing system, whether a current rate of increase or decrease of the variable to be limited is great enough that the variable will reach the limit within a predetermined period of time with no other changes as a second condition; and
   activating, by the computing system, a simulated or physical limit regulator when the first condition and the second condition are true.

2. The computer-implemented method of claim 1, wherein the activating of the simulated or physical limit regulator further comprises:
   passing, by the computing system, the simulated or physical limit regulator's output through appropriate minimum or maximum selection logic; and
   modifying, by the computing system, a command regulating a fuel flow rate to a simulated or physical engine.

3. The computer-implemented method of claim 2, wherein a third condition is defined by:

$$y_1 \geq (1-\gamma_1)^* y_{1max}$$

where $\gamma_1$ is a non-negative number that is less than a non-negative design parameter $\alpha_1$, and
   to prevent chatter in the fuel flow rate command, the computing system only activates the simulated or physical limit regulator when the following Boolean expression is true:
   (the first condition AND the second condition) OR the third condition.

4. The computer-implemented method of claim 1, wherein when the simulated or physical limit regulator is a maximum limit regulator, the predetermined limit range is determined by:

$$e_1 \leq \alpha_1 * y_{1max}$$

where $e_1$ is a maximum limit regulator error, $\alpha_1$ is a non-negative design parameter, and $y_{1max}$ is a maximum limit of the variable.

5. The computer-implemented method of claim 1, wherein when the simulated or physical limit regulator is a maximum limit regulator, the current rate of increase of the variable to be limited is determined by:

$$\frac{d}{dt}e_1 \leq \frac{-e_1}{\beta_1 * \Delta T}$$

where $e_1$ is a maximum limit regulator error, $\beta_1$ is an error derivative bound for the limit regulator, and $\Delta T$ is a controller step size for the computing system.

6. The computer-implemented method of claim 1, wherein when the simulated or physical limit regulator is a minimum limit regulator, the predetermined limit range is determined by:

$$e_2 \geq -\alpha_2 * y_{2min}$$

where $e_2$ is a minimum limit regulator error, $\alpha_2$ is a non-negative design parameter, and $y_{2min}$ is a minimum limit of the variable.

7. The computer-implemented method of claim 1, wherein when the simulated or physical limit regulator is a minimum limit regulator, the current rate of decrease of the variable to be limited is determined by:

$$\frac{d}{dt}e_2 \geq \frac{-e_2}{\beta_2 * \Delta T}$$

where $e_2$ is a minimum limit regulator error, $\beta_2$ is an error derivative bound for the limit regulator, and $\Delta T$ is a controller step size for the computing system.

8. A computer-implemented method, comprising:
   determining, by a computing system, whether a variable to be limited is within a predetermined range of a limit value as a first condition using at least one discrete equation;
   determining, by the computing system, whether a current rate of increase or decrease of the variable to be limited is great enough that the variable will reach the limit within a predetermined period of time with no other changes as a second condition using at least one discrete equation; and
   activating, by the computing system, a simulated or physical limit regulator when the first condition and the second condition are true.

9. The computer-implemented method of claim 8, wherein the activating of the simulated or physical limit regulator further comprises:
   passing, by the computing system, the simulated or physical limit regulator's output through appropriate minimum or maximum selection logic; and
   modifying, by the computing system, a command regulating a fuel flow rate to a simulated or physical engine.

10. The computer-implemented method of claim 9, wherein a third condition is defined by:

$$y_1 \geq (1-\gamma_1)^* y_{1max}$$

where $\gamma_1$ is a non-negative number that is less than a non-negative design parameter $\alpha_1$, and
   to prevent chatter in the fuel flow rate command, the computing system only activates the simulated or physical limit regulator when the following Boolean expression is true:
   (the first condition AND the second condition) OR the third condition.

11. The computer-implemented method of claim 8, wherein when the simulated or physical limit regulator is a maximum limit regulator, the predetermined limit range is determined by:

$$e_1[k] \leq \alpha_1 * y_{1max}$$

where $e_1[k]$ is a limit regulator error at a current time index, $\alpha_1$ is a non-negative design parameter, and $y_{1max}$ is a maximum limit of the variable.

12. The computer-implemented method of claim 8, wherein when the simulated or physical limit regulator is a maximum limit regulator, the current rate of increase of the variable to be limited is determined by:

$$\frac{1}{\Delta T}(e_1[k] - e_1[k-1]) \leq \frac{-e_1[k]}{\beta_1 * \Delta T}$$

where $e_1[k]$ is a limit regulator error at a current time step, $e_1[k-1]$ is a limit regulator error at a previous time step, $\beta_1$ is an error derivative bound for the limit regulator, and $\Delta T$ is a controller step size for the computing system.

13. The computer-implemented method of claim 8, wherein when the simulated or physical limit regulator is a minimum limit regulator, the predetermined limit range is determined by:

$$e_2[k] \geq -\alpha_2 * y_{2min}$$

where $e_2[k]$ is a limit regulator error at a current time step, $\alpha_2$ is a non-negative design parameter, and $y_{2min}$ is a minimum limit of the variable.

14. The computer-implemented method of claim 8, wherein when the simulated or physical limit regulator is a minimum limit regulator, the current rate of decrease of the variable to be limited is determined by:

$$\frac{1}{\Delta T}(e_2[k] - e_2[k-1]) \geq \frac{-e_2[k]}{\beta_2 * \Delta T}$$

where $e_2[k]$ is a limit regulator error at a current time step, $e_2[k-1]$ is a limit regulator error at a previous time step, $\beta_2$ is an error derivative bound for the limit regulator, and $\Delta T$ is a controller step size for the computing system.

15. An apparatus, comprising:
memory storing computer program instructions; and
at least one processor configured to execute the computer program instructions stored in the memory, the at least one processor configured to:
   determine whether a variable to be limited is within a predetermined range of a limit value as a first condition;
   determine whether a current rate of increase or decrease of the variable to be limited is great enough that the variable will reach the limit within a predetermined period of time with no other changes as a second condition; and
   activate a limit regulator when the first condition and the second condition are true.

16. The apparatus of claim 15, wherein when activating the limit regulator, the at least one processor is further configured to:
   pass the simulated or physical limit regulator's output through appropriate minimum or maximum selection logic; and
   modify a command regulating a fuel flow rate to a simulated or physical engine.

17. The apparatus of claim 15, wherein when the limit regulator is a maximum limit regulator, the at least one processor is further configured to determine the limit range by:

$$e_1[k] \leq \alpha_1 * y_{1max}$$

where $e_1[k]$ is a limit regulator error at a current time index, $\alpha_1$ is a non-negative design parameter, and $y_{1max}$ is a maximum limit of the variable.

18. The apparatus of claim 15, wherein when the limit regulator is a maximum limit regulator, the at least one processor is further configured to determine the current rate of increase of the variable to be limited by:

$$\frac{1}{\Delta T}(e_1[k] - e_1[k-1]) \leq \frac{-e_1[k]}{\beta_1 * \Delta T}$$

where $e_1[k]$ is a limit regulator error at a current time step, $e_1[k-1]$ is a limit regulator error at a previous time step, $\beta_1$ is an error derivative bound for the limit regulator, and $\Delta T$ is a controller step size for the computing system.

19. The apparatus of claim 15, wherein when the limit regulator is a minimum limit regulator, the at least one processor is further configured to determine the limit range by:

$$e_2[k] \geq -\alpha_2 * y_{2min}$$

where $e_2[k]$ is a limit regulator error at a current time step, $\alpha_2$ is a non-negative design parameter, and $y_{2min}$ is a minimum limit of the variable.

20. The apparatus of claim 15, wherein when the limit regulator is a minimum limit regulator, the at least one processor is further configured to determine the current rate of decrease of the variable to be limited by:

$$\frac{1}{\Delta T}(e_2[k] - e_2[k-1]) \geq \frac{-e_2[k]}{\beta_2 * \Delta T}$$

where $e_2[k]$ is a limit regulator error at a current time step, $e_2[k-1]$ is a limit regulator error at a previous time step, $\beta_2$ is an error derivative bound for the limit regulator, and $\Delta T$ is a controller step size for the computing system.

* * * * *